United States Patent
Abe et al.

(10) Patent No.: US 10,691,123 B2
(45) Date of Patent: *Jun. 23, 2020

(54) VEHICLE CONTROL SYSTEM, VEHICLE CONTROL METHOD, AND VEHICLE CONTROL PROGRAM

(71) Applicant: HONDA MOTOR CO., LTD., Minato-ku, Tokyo (JP)

(72) Inventors: Masaaki Abe, Wako (JP); Kunimichi Hatano, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/090,294

(22) PCT Filed: Apr. 8, 2016

(86) PCT No.: PCT/JP2016/061534
§ 371 (c)(1),
(2) Date: Oct. 1, 2018

(87) PCT Pub. No.: WO2017/175377
PCT Pub. Date: Oct. 12, 2017

(65) Prior Publication Data
US 2019/0113914 A1    Apr. 18, 2019

(51) Int. Cl.
*G05D 1/00* (2006.01)
*B60W 30/10* (2006.01)
(Continued)

(52) U.S. Cl.
CPC ......... *G05D 1/0061* (2013.01); *B60W 30/00* (2013.01); *B60W 30/10* (2013.01); *B60W 40/04* (2013.01);
(Continued)

(58) Field of Classification Search
CPC .......... B60W 2550/308; B60W 30/00; B60W 30/10; B60W 40/04; B60W 50/08; G05D 1/0061; G05D 1/0088; G05D 2201/0213
See application file for complete search history.

(56) References Cited

U.S. PATENT DOCUMENTS

| 5,530,651 A | * | 6/1996 | Uemura | G01S 15/86 |
| | | | | 701/301 |
| 6,825,756 B2 | * | 11/2004 | Bai | G01S 13/931 |
| | | | | 340/435 |

(Continued)

FOREIGN PATENT DOCUMENTS

| JP | 2000-20500 | 7/2000 |
| JP | 2000-205000 | 7/2000 |

(Continued)

OTHER PUBLICATIONS

International Search Report and Written Opinion for International Application No. PCT/JP2016/061534 dated Jul. 5, 2016, 14 pgs.

(Continued)

*Primary Examiner* — Babar Sarwar
(74) *Attorney, Agent, or Firm* — Amin, Turocy & Watson, LLP

(57) ABSTRACT

A vehicle control system including: an acquisition unit that is configured to acquire a traffic situation of an advancing direction destination of a subject vehicle; a prediction unit is configured to predict a future state related to the subject vehicle or the periphery of the subject vehicle with reference to the traffic situation that is acquired by the acquisition unit; and a control unit that is configured to perform vehicle control, and is configured to suppress switching or release of the vehicle control in a case where the prediction unit is configured to predict that the vehicle control will return to a state before the switching or the release is performed within (Continued)

a predetermined period or within a predetermined travel distance after the switching or the release of the vehicle control is performed.

11 Claims, 17 Drawing Sheets

(51) Int. Cl.
  *B60W 40/04* (2006.01)
  *B60W 30/00* (2006.01)
  *B60W 50/08* (2020.01)

(52) U.S. Cl.
  CPC ........... *B60W 50/08* (2013.01); *G05D 1/0088* (2013.01); *B60W 2554/801* (2020.02); *G05D 2201/0213* (2013.01)

(56) References Cited

U.S. PATENT DOCUMENTS

| | | | | |
|---|---|---|---|---|
| 7,395,144 | B2 * | 7/2008 | Isaji | B60T 7/22 180/170 |
| 7,983,828 | B2 * | 7/2011 | Ezoe | B60T 7/12 180/275 |
| 8,244,458 | B1 * | 8/2012 | Blackburn | G08G 1/166 340/435 |
| 8,532,901 | B2 * | 9/2013 | Nitz | B60K 31/0008 340/467 |
| 8,736,483 | B2 * | 5/2014 | Takeuchi | B60W 30/09 342/71 |
| 2002/0184236 | A1 * | 12/2002 | Donath | B60R 1/00 |
| 2004/0030499 | A1 * | 2/2004 | Knoop | B60W 10/18 701/301 |
| 2007/0005609 | A1 * | 1/2007 | Breed | G01S 13/867 |
| 2009/0043440 | A1 * | 2/2009 | Matsukawa | G05D 1/0214 701/25 |
| 2009/0088925 | A1 * | 4/2009 | Sugawara | B60W 30/12 701/41 |
| 2009/0150034 | A1 * | 6/2009 | Ezoe | B60T 7/12 701/53 |
| 2010/0076676 | A1 * | 3/2010 | Machino | G01C 21/3461 701/413 |
| 2010/0134263 | A1 * | 6/2010 | Mathony | B60W 30/09 340/435 |
| 2012/0235853 | A1 * | 9/2012 | Takeuchi | B60W 30/09 342/71 |
| 2012/0239265 | A1 * | 9/2012 | Kato | B60T 7/22 701/70 |
| 2014/0229069 | A1 * | 8/2014 | Akiyama | B60T 7/12 701/41 |
| 2015/0211868 | A1 | 7/2015 | Matsushita et al. | |
| 2015/0353088 | A1 | 12/2015 | Ishikawa | |
| 2016/0327947 | A1 * | 11/2016 | Ishikawa | B60W 50/14 |
| 2016/0335892 | A1 * | 11/2016 | Okada | B60T 7/22 |
| 2017/0053534 | A1 * | 2/2017 | Lokesh | G08G 1/22 |
| 2017/0313325 | A1 * | 11/2017 | Asakura | G05D 1/0248 |
| 2018/0268702 | A1 * | 9/2018 | Morotomi | G08G 1/166 |
| 2019/0039626 | A1 * | 2/2019 | Hatano | G05D 1/0088 |
| 2019/0113914 | A1 * | 4/2019 | Abe | B60W 30/10 |

FOREIGN PATENT DOCUMENTS

| | | |
|---|---|---|
| JP | 2001-273588 | 10/2001 |
| JP | 2004-157731 | 6/2004 |
| JP | 2004-347470 | 12/2004 |
| JP | 2005-067483 | 3/2005 |
| JP | 2006-111170 | 4/2006 |
| JP | 2008-170404 | 7/2008 |
| JP | 2009-029386 | 2/2009 |
| JP | 2015-024746 | 2/2015 |
| JP | 2015-089801 | 5/2015 |
| JP | 2015-141051 | 8/2015 |
| JP | 2015141051 A * | 8/2015 |
| JP | 2015-157513 | 9/2015 |
| JP | 2015-168406 | 9/2015 |
| JP | 2015-175825 | 10/2015 |
| JP | 2015-182624 | 10/2015 |
| JP | 2015-230573 | 12/2015 |
| JP | 2016-045856 | 4/2016 |
| JP | 2016-095627 | 5/2016 |
| WO | 2008/068953 | 6/2008 |
| WO | 2014/013985 | 1/2014 |
| WO | 2015/190212 | 12/2015 |
| WO | 2016/052507 | 4/2016 |
| WO | WO-2016052507 A1 * | 4/2016 ........... B60W 30/10 |
| WO | 2017/051478 | 3/2017 |

OTHER PUBLICATIONS

International Preliminary Report on Patentability for International Application No. PCT/JP2016/061534 dated Jul. 17, 2018, 16 pgs.
Japanese Office Action for Japanese Patent Application No. 2018-510207 dated Jul. 2, 2019.
International Search Report and Written Opinion for International Application No. PCT/JP2016/061897 dated Jul. 19, 2016, 10 pgs.
Non-Final Office Action for U.S. Appl. No. 16/090,846 dated Oct. 4, 2019.

* cited by examiner

188

| | DRIVING MODE | MANUAL DRIVING MODE | AUTOMATED DRIVING MODE | | | |
|---|---|---|---|---|---|---|
| NON-DRIVING OPERATION SYSTEM | | | MODE A | MODE B | MODE C | ... |
| NAVIGATION OPERATION | | NOT-AVAILABLE | AVAILABLE | AVAILABLE | NOT-AVAILABLE | ... |
| CONTENT REPRODUCING OPERATION | | NOT-AVAILABLE | AVAILABLE | NOT-AVAILABLE | NOT-AVAILABLE | ... |
| NSTRUMENT PANEL OPERATION | | NOT-AVAILABLE | AVAILABLE | AVAILABLE | AVAILABLE | ... |
| ... | | ... | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Research on automated driving that automatically controls at least one of acceleration/deceleration, and steering of a subject vehicle has been progressing. In this regard, there is disclosed a vehicle auto-drive control method of calculating a target vehicle control amount for automatically controlling at least one of a steering angle of a steering wheel and a vehicle braking force in correspondence with a travel situation of a vehicle, and controlling at least one of the steering angle of the steering wheel and the vehicle braking force on the basis of the target control amount (for example, refer to Patent Document 1).

CITATION LIST

Patent Literature

[Patent Document 1]
Japanese Unexamined Patent Application, First Publication No. 2015-157513

SUMMARY OF INVENTION

Technical Problem

However, in the related art, switching of vehicle control is frequently performed, and as a result, convenience deteriorates, or a vehicle occupant feels discomfort in some cases.

The invention has been made in consideration of such circumstances, and an object thereof is to suppress unnecessary switching of vehicle control.

Solution to Problem

According to a first aspect of the invention, there is provided a vehicle control system including: an acquisition unit that is configured to acquire a traffic situation of an advancing direction destination of a subject vehicle; a prediction unit that is configured to predict a future state related to the subject vehicle or the periphery of the subject vehicle with reference to the traffic situation that is acquired by the acquisition unit; and a control unit that is configured to perform vehicle control, and is configured to suppress switching or release of the vehicle control in a case where the prediction unit is configured to predict that the vehicle control will return to a state before the switching or the release is performed within a predetermined period or within a predetermined travel distance after the switching or the release of the vehicle control is performed.

According to a second aspect of the invention, in the vehicle control system according to the first aspect, the control unit is configured to selectively perform any one among a plurality of automated driving modes which are different in the degree of automated driving, and the control unit is configured to suppress switching or release of the automated driving mode in a case where the prediction unit is configured to predict that the vehicle control will return to a state before the switching or the release is performed within a predetermined period or within a predetermined travel distance after the switching or the release of the automated driving mode is performed.

According to a third aspect of the invention, in the vehicle control system according to the first or second aspect, the control unit is configured to automatically perform lane changing, and the control unit is configured to not perform the lane changing in a case where the prediction unit is configured to predict that a lane returns to a lane before the lane changing within a predetermined period or within a predetermined travel distance after performing the lane changing.

According to a fourth aspect of the invention, in the vehicle control system according to any one of the first to third aspects, the control unit is configured to perform vehicle control that is switched or released on the basis of a speed condition, and the control unit is configured to suppress a speed variation that satisfies the speed condition in a case where the prediction unit is configured to predict that the vehicle control will return to a state before the vehicle control is switched or released within a predetermined period or within a predetermined travel distance.

According to a fifth aspect of the invention, in the vehicle control system according to any one of the first to fourth aspects, the control unit is configured to perform control of performing automated driving in which at least one of acceleration/deceleration or steering of the subject vehicle is automatically controlled, and of stopping the automated driving in a predetermined situation to switch the automated driving to manual driving, and the control unit is configured to suppress switching from the manual driving to the automated driving in a case where the prediction unit is configured to predict that the predetermined situation arises again within a predetermined period after switching from the manual driving to the automated driving.

According to a sixth aspect of the invention, the vehicle control system according to any one of the first to fifth aspects may further include an output unit that is configured to output information. The control unit is configured to allow the output unit to output information indicating the suppression state in a case where the switching or the release of the vehicle control is suppressed.

According to a seventh aspect of the invention, the vehicle control system according to any one of the first to sixth aspects may further include a communication unit that is configured to perform communication with the outside of the vehicle. The prediction unit is configured to predict whether or not the vehicle control will return to a state before the switching or the release is performed on the basis of information received by the communication unit.

According to an eighth aspect of the invention, there is provided vehicle control method. The vehicle control method is configured to allow an in-vehicle computer to: predict a future state related to a subject vehicle or the periphery of the subject vehicle with reference to a traffic situation of an advancing direction destination of the subject vehicle; and suppress switching or release of the vehicle control in a case where it is predicted that the vehicle control will return to a state before the switching or the release is performed within a predetermined period or within a predetermined travel distance after the switching or the release of the vehicle control is performed.

According to a ninth aspect of the invention, there is provided a vehicle control program. The vehicle control program is configured to allow an in-vehicle computer to: predict a future state related to the subject vehicle or the periphery of a subject vehicle with reference to a traffic situation of an advancing direction destination of the subject vehicle; and suppress switching or release of the vehicle control in a case where it is predicted that the vehicle control will return to a state before the switching or the release is performed within a predetermined period or within a predetermined travel distance after the switching or the release of the vehicle control is performed.

Advantageous Effects of Invention

According to the aspects of the invention, it is possible to suppress unnecessary switching of vehicle control.

DESCRIPTION OF EMBODIMENTS

Hereinafter, an embodiment of a vehicle control system, a vehicle control method, and a vehicle control program of the invention will be described with reference to the accompanying drawings.

Figure 1:
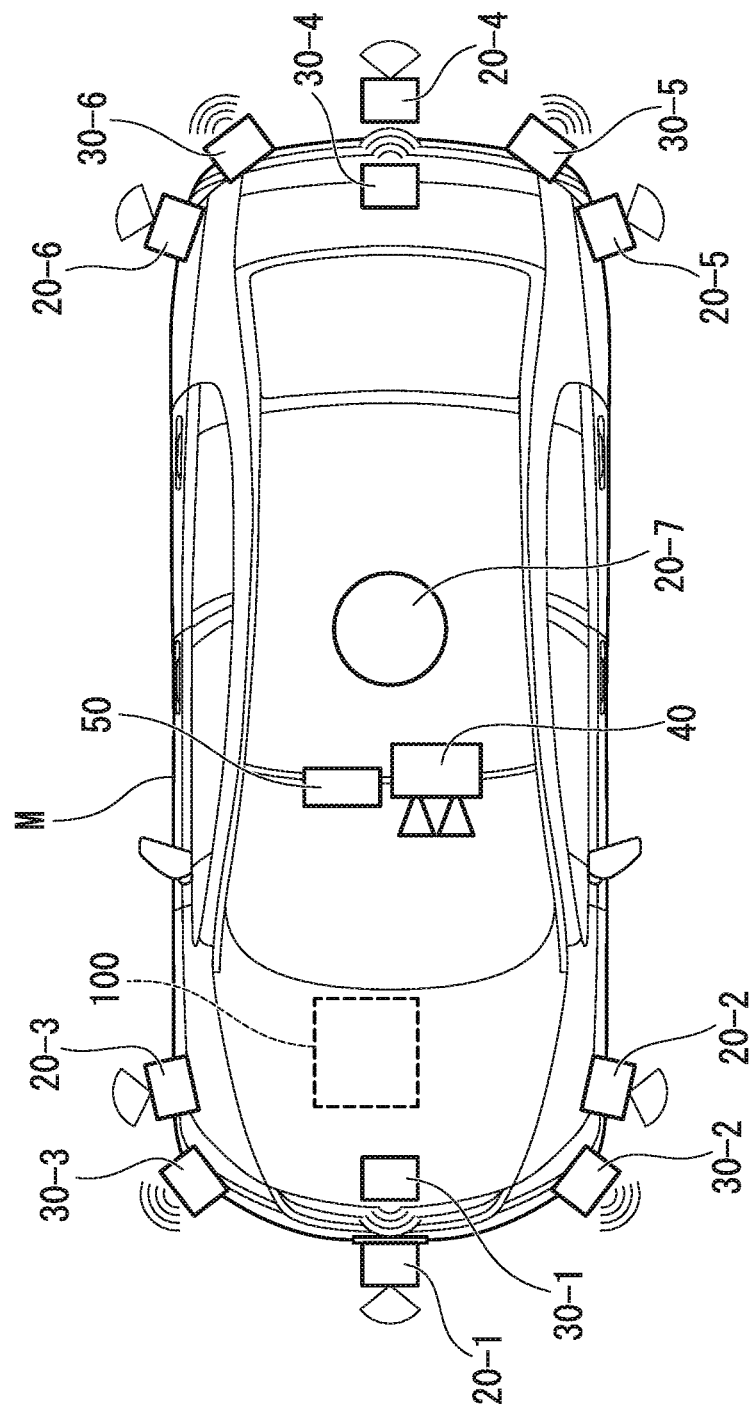
FIG. 1 is a view showing constituent elements of a subject vehicle M.

FIG. 1 is a view showing constituent elements of a vehicle (hereinafter, referred to as "subject vehicle M") in which a vehicle control system 100 of this embodiment is mounted. For example, a vehicle in which the vehicle control system 100 is mounted is a two-wheeled vehicle, a three-wheeled vehicle, a four-wheeled vehicle, or the like, and may be a vehicle that uses an internal combustion engine such as a diesel engine and a gasoline engine as a power source, an electric vehicle that uses an electric motor as the power source, a hybrid vehicle including both the internal combustion engine and the electric motor, or the like. In addition, for example, the above-described electric vehicle is driven by using electric power that is discharged from a battery such as a secondary battery, a hydrogen fuel cell, a metallic fuel cell, and an alcohol fuel cell.

As shown in FIG. 1, sensors such as finders 20-1 to 20-7, radars 30-1 to 30-6, and a camera 40, a navigation device 50, and the vehicle control system 100 are mounted on the subject vehicle M.

For example, the finders 20-1 to 20-7 are a light detection and ranging or a laser imaging detection and ranging (LIDAR) that measures scattered light with respect to irradiation light and measures a distance to a target. For example, the finder 20-1 is attached to a front grille and the like, and the finders 20-2 and 20-3 are attached to a lateral surface of a vehicle body, a door mirror, the inside of a headlight, the vicinity of a side lamp, and the like. The finder 20-4 is attached to a trunk lid, and the like, and the finders 20-5 and 20-6 are attached to a lateral surface of the vehicle body, the inside of a tail lamp, and the like. For example, the above-described finders 20-1 to 20-6 have a detection region of approximately 150° with respect to a horizontal direction. In addition, the finder 20-7 is attached to a roof and the like. For example, the finder 20-7 has a detection region of 360° with respect to the horizontal direction.

For example, the above-described radars 30-1 and 30-4 are long range millimeter wave radars in which a detection region in a depth direction is wider in comparison to other radars. In addition, the radars 30-2, 30-3, 30-5, and 30-6 are intermediate range millimeter radars in which a detection region in the depth direction is narrower in comparison to the radars 30-1 and 30-4.

Hereinafter, in a case where the finders 20-1 to 20-7 are not particularly discriminated, the finders 20-1 to 20-7 are simply described as "finder 20". In a case where the radars 30-1 to 30-6 are not particularly discriminated, the radars 30-1 to 30-6 are simply described as "radar 30". For example, the radar 30 detects an object by a frequency modulated continuous wave (FM-CW) method.

For example, the camera 40 is a digital camera that uses an individual imaging element such as a charge coupled device (CCD) and a complementary metal oxide semiconductor (CMOS). The camera 40 is attached to an upper side of a front windshield, a rear surface of a rearview mirror, and the like. For example, the camera 40 periodically and repetitively captures an image of the area in front of the subject vehicle M. The camera 40 may be a stereo camera including a plurality of cameras.

Furthermore, the configurations shown in FIG. 1 are illustrative only, and parts of the configurations may be omitted or other configurations may be added.

Figure 2:
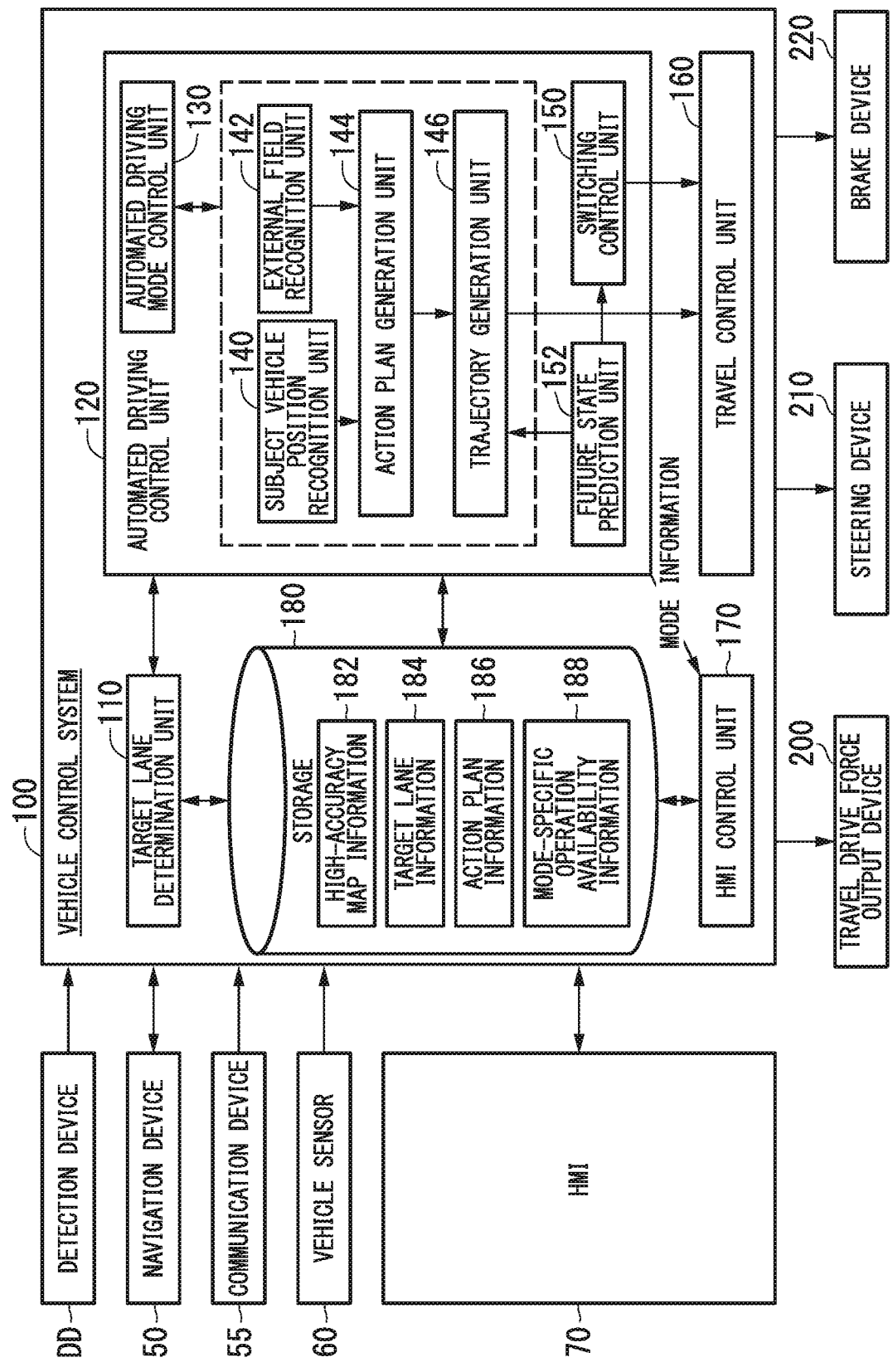
FIG. 2 is a functional configuration diagram with a focus on a vehicle control system 100, and a functional configuration diagram of the subject vehicle M.

FIG. 2 is a functional configuration diagram with a focus on the vehicle control system 100 according to this embodiment. A detection device DD including the finder 20, the radar 30, the camera 40, and the like, the navigation device 50, a communication device 55, a vehicle sensor 60, a human machine interface (HMI) 70, the vehicle control system 100, a travel drive force output device 200, a steering device 210, and a brake device 220 are mounted on the subject vehicle M. The devices or apparatus are connected to each other through a multiplex communication line such as a controller area network (CAN) communication line, a serial communication line, a radio communication network, and the like. Furthermore, a vehicle control system in the appended claims does not represent only the "vehicle control system 100", and may include a configuration (the detection device DD, the HMI 70, and the like) other than the vehicle control system 100.

The navigation device 50 includes global navigation satellite system (GNSS) receiver and map information (navigation map), a touch panel type display that functions as a user interface, a speaker, a microphone, and the like. The navigation device 50 specifies a position of the subject vehicle M by the GNSS receiver, and derives a route from the position to a destination that is designated by a user. The route derived by the navigation device 50 is provided to a target lane determination unit 110 of the vehicle control system 100. The position of the subject vehicle M may be specified or supplemented by an inertial navigation system (INS) that uses an output of the vehicle sensor 60. In addition, when the vehicle control system 100 executes a manual driving mode, the navigation device 50 performs guidance with respect to the route to the destination with voice or navigation display. Furthermore, the configuration that specifies the position of the subject vehicle M may be provided independently from the navigation device 50. In addition, the navigation device 50 may be realized, for example, by a function of a terminal device such as a smart phone and a tablet terminal which are carried by a user. In this case, information is transmitted and received between the terminal device and the vehicle control system 100 by radio communication or wired communication.

For example, the communication device 55 performs radio communication using a cellular network, a Wi-Fi network, Bluetooth (registered trademark), dedicated short range communication (DSRC), and the like. For example, the communication device 55 performs radio communication with an information providing server of a system such as a Vehicle Information and Communication System (VICS (registered trademark)) that monitors a traffic situation of a road, and acquires information (hereinafter, referred to as "traffic information") indicating a traffic situation of a road on which the subject vehicle M travels or a scheduled travel road. The traffic information includes information such as forward traffic jam information, time required to pass through a traffic jam site, accident/disabled car/construction information, speed regulation/lane regulation information, information on a position of a parking lot and whether or not a parking lot/service area/parking area is full or has space. In addition, the communication device 55 may acquire the traffic information by performing communication with a radio beacon provided in a side shoulder of a road, or by performing vehicle-to-vehicle communication with another vehicle that travels near the subject vehicle M. The communication device 55 is an example of an "acquisition unit".

The vehicle sensor 60 includes a vehicle speed sensor that determines a vehicle speed, an acceleration sensor that detects acceleration, a yaw rate sensor that determines an angular velocity around a vertical axis, an orientation sensor that determines a direction of the subject vehicle M, and the like.

Figure 3:
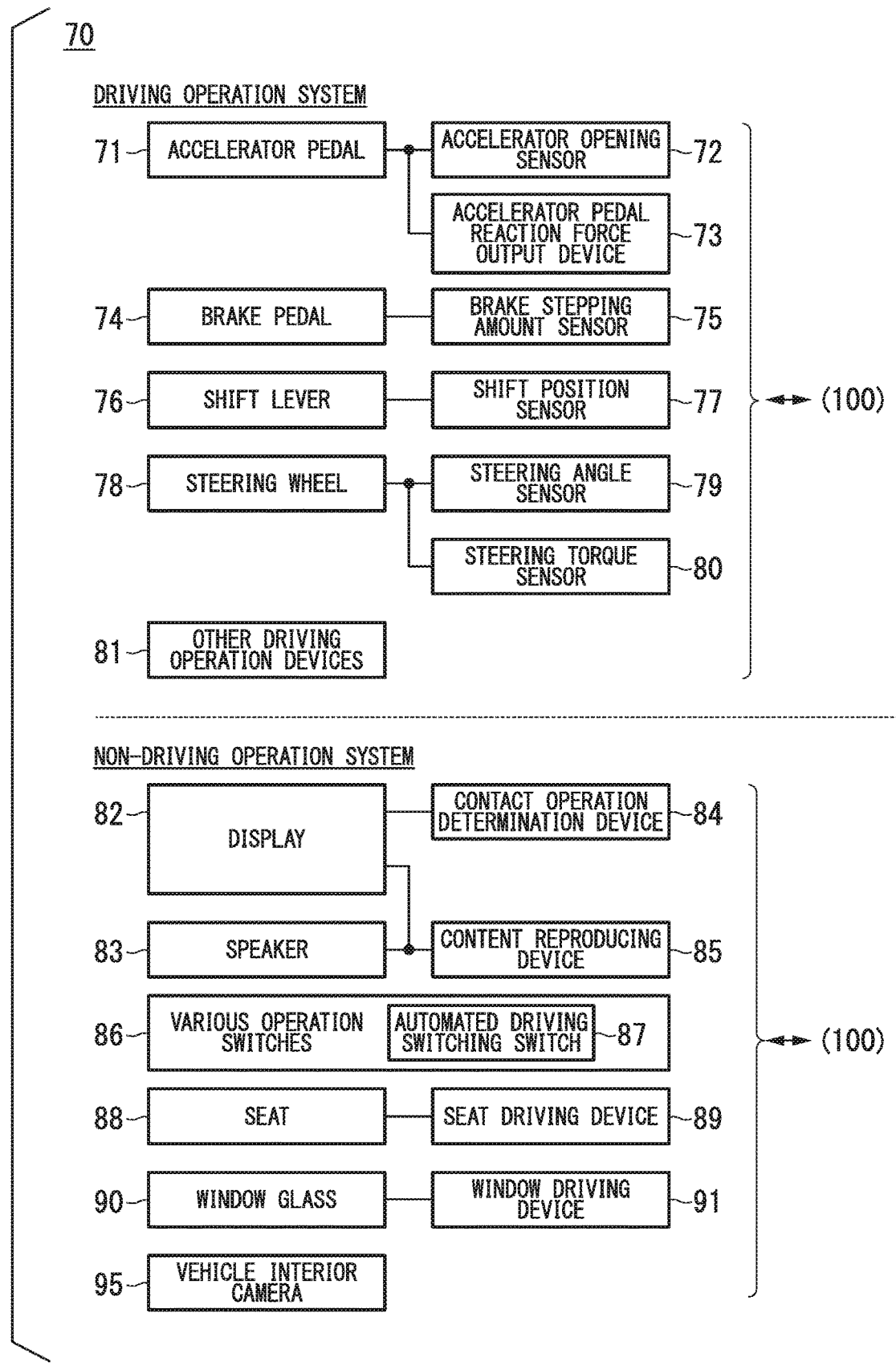
FIG. 3 is a configuration diagram of an HMI 70.

FIG. 3 is a configuration diagram of the HMI 70. For example, the HMI 70 includes a configuration of a driving operation system, and a configuration of a non-driving operation system. A boundary thereof is not clear, and the configuration of the driving operation system may include a function of the non-driving operation system (or vice versa). The navigation device 50 and the HMI 70 are examples of an "output unit".

For example, the HMI 70 includes an accelerator pedal 71, an accelerator opening sensor 72, an accelerator pedal reaction force output device 73, a brake pedal 74, a brake stepping amount sensor (or a master pressure sensor and the like) 75, a shift lever 76, a shift position sensor 77, a steering wheel 78, a steering angle sensor 79, a steering torque sensor 80, and other driving operation devices 81 as the configuration of the driving operation system.

The accelerator pedal 71 is an operator that accepts an acceleration instruction (or a deceleration instruction by a return operation) by the vehicle occupant. The accelerator opening sensor 72 determines a stepping amount of the accelerator pedal 71, and outputs an accelerator opening signal indicating the stepping amount to the vehicle control system 100. Furthermore, the accelerator opening signal may be directly output to the travel drive force output device 200, the steering device 210, or the brake device 220 instead of being output to the vehicle control system 100. This is also true of configurations of other driving operation systems to be described below. For example, the accelerator pedal reaction force output device 73 outputs a force (operation reaction force) in a direction opposite to an operation direction with respect to the accelerator pedal 71 in correspondence with an instruction from the vehicle control system 100.

The brake pedal 74 is an operator that accepts a deceleration instruction by the vehicle occupant. The brake stepping amount sensor 75 determines a stepping amount (or a stepping force) of the brake pedal 74, and outputs a brake signal indicating a determination result to the vehicle control system 100.

The shift lever 76 is an operator that accepts a shift stage change instruction by the vehicle occupant. The shift position sensor 77 determines a shift stage instructed by the vehicle occupant, and outputs a shift position signal indicating a determination result to the vehicle control system 100.

The steering wheel 78 is an operator that accepts a turning instruction by the vehicle occupant. The steering angle sensor 79 determines an operation angle of the steering wheel 78, and outputs a steering angle signal indicating a determination result to the vehicle control system 100. The steering torque sensor 80 determines the torque applied to the steering wheel 78, and outputs a steering torque signal indicating a determination result to the vehicle control system 100.

Examples of the other driving operation devices 81 include a joy stick, a button, a dial switch, a graphical user interface (GUI) switch, and the like. The other driving operation devices 81 accept an acceleration instruction, a deceleration instruction, a turning instruction, and the like, and output the instructions to the vehicle control system 100.

For example, the HMI 70 includes a display 82, a speaker 83, a contact operation detection device 84, a content reproducing device 85, various operation switches 86, a seat 88, a seat driving device 89, a window glass 90, and a window driving device 91 as the configuration of the non-driving operation system.

Examples of the display 82 include a liquid crystal display (LCD), an organic electroluminescence (EL) display, and the like which are attached to respective portions of an instrument panel, an arbitrary site that faces the passenger's seat or a rear seat, and the like. In addition, the display 82 may be a head-up display (HUD) that projects an image on a front windshield or another window. The speaker 83 outputs a voice. In a case where the display 82 is a touch panel, the contact operation determination device 84 determines a contact position (touch position) on a display screen of the display 82, and outputs the contact position to the vehicle control system 100. Furthermore, in a case where the display 82 is not the touch panel, the contact operation determination device 84 may be omitted.

For example, the content reproducing device 85 includes a digital versatile disc (DVD) reproducing device, a compact disc (CD) reproducing device, a television receiver, a generation device of various guidance images, and the like. One or all of the display 82, the speaker 83, the contact operation determination device 84, and the content reproducing device 85 may be common to the navigation device 50.

The various operation switches 86 are disposed at arbitrary sites on a vehicle interior side. The various operation switches 86 include an automated driving switching switch 87 that gives an instruction of initiation (or initiation in the future) and stoppage of automated driving. The automated driving switching switch 87 may be any one of a graphical user interface (GUI) switch and a mechanical switch. In addition, the various operation switches 86 may include a switch that drives the seat driving device 89 or the window driving device 91.

The seat 88 is a seat in which the vehicle occupant sits. The seat driving device 89 freely drives a reclining angle, a position in a front and rear direction, a yaw angle of the seat 88, and the like. For example, the window glass 90 is provided in respective doors. The window driving device 91 performs opening/closing operation of the window glass 90.

The vehicle interior camera 95 is a digital camera that uses an individual imaging element such as a CCD and CMOS. The vehicle interior camera 95 is attached to a position such as a rearview mirror, a steering boss portion, and an instrument panel at which an image of at least the head of the vehicle occupant who is configured to perform a driving operation can be captured. For example, the camera 40 periodically and repetitively captures an image of the vehicle occupant.

The travel drive force output device 200, the steering device 210, and the brake device 220 will be described prior to the description of the vehicle control system 100.

The travel drive force output device 200 outputs a travel drive force (torque) necessary for driving of a vehicle to drive wheels. For example, the travel drive force output device 200 includes an engine, a transmission, and an engine electronic control unit (ECU) that controls the engine in a case where the subject vehicle M is a vehicle that uses an internal combustion engine as a power source, a travel motor and a motor ECU that controls the travel motor in a case where the subject vehicle M is an electric vehicle that uses an electric motor as the power source, or the engine, the transmission, the engine ECU, the travel motor, and the motor ECU in a case where the subject vehicle M is a hybrid vehicle. In a case where the travel drive force output device 200 includes only the engine, the engine ECU adjusts a throttle opening of the engine, a shift stage, and the like in accordance with information input from a travel control unit 160 to be described later. In addition, in a case where the travel drive force output device 200 includes only the travel motor, the motor ECU adjusts a duty ratio of a PWM signal that is applied to the travel motor in accordance with information input from the travel control unit 160. In addition, in a case where the travel drive force output device 200 includes both the engine and the travel motor, the engine ECU and the motor ECU control the travel drive force in cooperation with each other in accordance with information input from the travel control unit 160.

For example, the steering device 210 includes a steering ECU, and an electric motor. For example, the electric motor applies a force to a rack and pinion mechanism to change a direction of a steering wheel. The steering ECU drives the electric motor in accordance with information input from the vehicle control system 100, or information of a steering angle or steering torque which is input to change the direction of the steering wheel.

For example, the brake device 220 is an electric servo-brake device including a brake caliper, a cylinder that transmits a hydraulic pressure to the brake caliper, an electric motor that generates the hydraulic pressure in the cylinder, and a braking control unit. The braking control unit of the electric servo-brake device controls the electric motor in accordance with information input from the travel control unit 160 to allow brake torque corresponding to a braking operation to be output to respective wheels. The electric servo-brake device may include a mechanism that transmits a hydraulic pressure generated by an operation of the brake pedal to the cylinder through a master cylinder as a backup mechanism. Furthermore, the brake device 220 may be an electronic control type hydraulic brake device without limitation to the above-described electric servo-brake device. The electronic control type hydraulic brake device controls an actuator in accordance with information input from the travel control unit 160 to transmit a hydraulic pressure of the master cylinder to the cylinder. In addition, the brake device 220 may include a regenerative brake realized by a travel motor that can be included in the travel drive force output device 200.

[Vehicle Control System]

Hereinafter, the vehicle control system 100 will be described. The vehicle control system 100 is realized, for example, by one or more processors or hardware having an equivalent function. The vehicle control system 100 may have a configuration in which an electronic control unit (ECU) in which a processor such as a central processing unit (CPU), a storage device, and a communication interface are connected to each other by an internal bus, a micro-processing unit (MPU), and the like are combined with each other.

Returning to FIG. 2, the vehicle control system 100 includes, for example, the target lane determination unit 110, an automated driving control unit 120, the travel control unit 160, and the storage 180. For example, the automated driving control unit 120 includes an automated driving mode control unit 130, a subject vehicle position recognition unit 140, an external field recognition unit 142, an action plan generation unit 144, a trajectory generation unit 146, a switching control unit 150, and a future state prediction unit 152. A combination of the automated driving mode control unit 130, the action plan generation unit 144, the trajectory generation unit 146, and the switching control unit 150 is an example of a "control unit".

Some or all of the target lane determination unit 110, the respective units of the automated driving control unit 120, and the travel control unit 160 are realized when a processor executes a program (software). In addition, some or all of the units may be realized by hardware such as large scale integration (LSI) and an application specific integrated circuit (ASIC), or may be realized by a combination of software and the hardware.

For example, information such as high-accuracy map information 182, target lane information 184, action plan information 186, and mode-specific operation availability information 188 is stored in the storage 180. The storage 180 is realized by a read only memory (ROM), a random access memory (RAM), a hard disk drive (HDD), a flash memory, and the like. The program that is executed by the processor may be stored in the storage 180 in advance, or may be downloaded from an external device through in-vehicle Internet equipment, and the like. In addition, the program may be installed in the storage 180 when a portable storage medium that stores the program is mounted in a drive device (not shown). In addition, the vehicle control system 100 may be dispersed among a plurality of computer devices.

For example, the target lane determination unit 110 is realized by an MPU. The target lane determination unit 110 divides a route provided form the navigation device 50 into a plurality of blocks (for example, divides the route for every 100 [m] in a vehicle advancing direction), and determines a target lane for every block with reference to the high-accuracy map information 182. For example, the target lane determination unit 110 makes a determination regarding which lane from the left to travel in. For example, in a case where there are a branch site, a merging site, and the like on the route, the target lane determination unit 110 determines a target lane so that the subject vehicle M can travel along a reasonable travel route to advance to a branch destination. The target lane determined by the target lane determination unit 110 is stored in the storage 180 as the target lane information 184.

The high-accuracy map information 182 is map information with higher accuracy in comparison to a navigation map included in the navigation device 50. For example, the high-accuracy map information 182 includes information of the center of the lane, information of a boundary of the lane, and the like. In addition, the high-accuracy map information 182 includes road information, traffic regulation information, address information (addresses, postal codes), facility information, telephone number information, and the like. The road information includes information indicating a road type such as an expressway, a toll road, a national road, and a prefectural road, and information such as the number of lanes of a road, a width of each lane, a gradient of a road, a position of a road (three-dimensional coordinates including a longitude, a latitude, and height), a curvature of a curve of a lane, a position of a merging point and a branch point of lanes, and a sign installed on the road. The traffic regulation information includes information indicating a situation in which lanes are blocked due to construction, traffic accidents, a traffic jam, and the like.

The automated driving mode control unit 130 determines a mode of automated driving that is performed by the automated driving control unit 120. The mode of the automated driving in this embodiment includes the following modes. Furthermore, the following description is illustrative only, and the number of modes of automated driving may be determined in an arbitrary manner.

[Mode A]

A mode A is a mode in which the degree of automated driving is highest. In a case where the mode A is performed, the entirety of vehicle control such as complicated merging control is automatically performed, and thus it is not necessary for a vehicle occupant to monitor the periphery or a state of the subject vehicle M (peripheral monitoring duty does not occur).

Here, as an example of a travel aspect that is selected in the mode A, there is a traffic jam following mode (low-speed following mode; traffic jam pilot (TJP)) of following a preceding vehicle during a traffic jam. In the traffic jam following mode, stable automated driving can be realized by following a preceding vehicle on a congested expressway. The traffic jam following mode is released, for example, in a case where a travel speed of the subject vehicle M becomes equal to or greater than a predetermined speed (for example, 60 km/h). In addition, the mode A is switched to another travel aspect at a termination timing of the traffic jam following mode in some cases, but switching may be performed to another travel aspect capable of being selected in the mode A.

[Mode B]

A mode B is a mode in which the degree of automated driving is high next to the mode A. In a case where the mode B is performed, principally, the entirety of vehicle control is automatically performed, but a driving operation of the subject vehicle M is delegated to the vehicle occupant in correspondence with a situation. According to this, it is necessary for the vehicle occupant to monitor the periphery or the state of the subject vehicle M (peripheral monitoring duty further increases in comparison to the mode A).

[Mode C]

A mode C is a mode in which the degree of automated driving is high next to the mode B. In a case where mode C is performed, it is necessary for the vehicle occupant to perform a confirmation operation corresponding to a situation with respect to the HMI 70. In the mode C, for example, in a case where the vehicle occupant is notified of a lane changing timing, and the vehicle occupant performs an operation of instructing the HMI 70 to change lanes, automatic lane changing is performed. According to this, it is necessary for the vehicle occupant to monitor the periphery or the state of the subject vehicle M.

The automated driving mode control unit 130 determines the mode of the automated driving on the basis of an operation by the vehicle occupant with respect to the HMI 70, an event determined by the action plan generation unit 144, a travel aspect determined by the trajectory generation unit 146, and the like. The HMI control unit 170 is notified of the mode of the automated driving. In addition, a limit corresponding to a performance of the determination device DD of the subject vehicle M, and the like may be set to the mode of the automated driving. For example, in a case where the performance of the determination device DD is low, the mode A may not be performed.

In any automated driving mode, switching to manual driving mode (overriding) can be performed by an operation with respect to a configuration of the driving operation system in the HMI 70. For example, the overriding is initiated in a case where the operation by the vehicle occupant of the subject vehicle M with respect to the driving operation system of the HMI 70 continues for a predetermined time or longer, the operation is equal to or greater than a predetermined operation variation amount (for example, an accelerator opening of the accelerator pedal 71, a brake stepping amount of the brake pedal 74, a steering angle of the steering wheel 78), or the operation with respect to the driving operation system is performed a predetermined number of times or greater.

The subject vehicle position recognition unit 140 of the automated driving control unit 120 recognizes a lane (travel lane) in which the subject vehicle M travels, and a relative position of the subject vehicle M with respect to the travel lane on the basis of the high-accuracy map information 182 stored in the storage 180, and information input from the finder 20, the radar 30, the camera 40, the navigation device 50, or the vehicle sensor 60.

For example, the subject vehicle position recognition unit 140 recognizes the travel lane by comparing a pattern of a road partition line (for example, an arrangement of a solid line and a broken line) that is recognized from the high-accuracy map information 182, and a pattern of a load partition line near the subject vehicle M that is recognized from an image captured by the camera 40. In the recognition, a position of the subject vehicle M which is acquired from the navigation device 50, or a processing result by the INS may be added.

Figure 4:
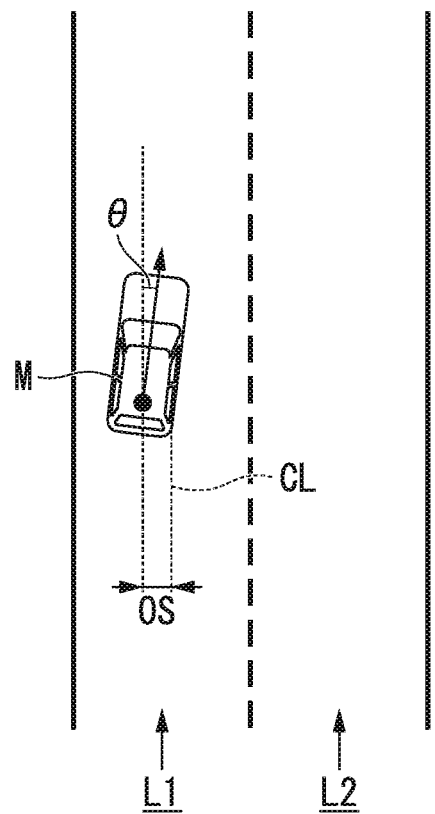
FIG. 4 is a view showing an aspect in which a relative position of the subject vehicle M with respect to a travel lane L1 is recognized by a subject vehicle position recognition unit 140.

FIG. 4 is a view showing an aspect in which a relative position of the subject vehicle M with respect to a travel lane L1 is recognized by the subject vehicle position recognition unit 140. For example, the subject vehicle position recognition unit 140 recognizes a deviation OS of a reference point (for example, the center of gravity) of the subject vehicle M from the travel lane center CL, and an angle θ of an advancing direction of the subject vehicle M with respect to a line obtained by connecting travel lane centers CL as a relative position of the subject vehicle M with respect to the travel lane L1. Furthermore, alternatively, the subject vehicle position recognition unit 140 may recognize a position of the reference point of the subject vehicle M with respect to any lateral end of the subject vehicle lane L1, and the like as the relative position of the subject vehicle M with respect to the travel lane. The relative position of the subject vehicle M which is recognized by the subject vehicle position recognition unit 140 is provided to the target lane determination unit 110.

The external field recognition unit 142 recognizes a state such as a position, a speed, and an acceleration of a nearby vehicle on the basis of information input from the finder 20, the radar 30, the camera 40, and the like. For example, the nearby vehicle is a vehicle that travels in the vicinity of the subject vehicle M and travels in the same direction as the subject vehicle M. The position of the nearby vehicle may be indicated as a representative point such as the center of gravity and a corner of another vehicle, or may be indicated as a region that is expressed as a contour of the other vehicle. The "state" of the nearby vehicle may include the acceleration of the nearby vehicle, and whether or not the nearby vehicle is changing a lane (or whether or not the nearby vehicle intends to change lanes) which are understood on the basis of information of the various devices. In addition, the external field recognition unit 142 may recognize positions of a guard rail, an electric pole, a parked vehicle, a pedestrian, and other objects in addition to the nearby vehicle.

The action plan generation unit 144 sets a start point of the automated driving, and/or a destination of the automated driving. The start point of the automated driving may be a current position of the subject vehicle M, or a point at which an operation of instructing the automated driving is performed. The action plan generation unit 144 generates an action plan in a section between the start point and the destination of the automated driving. Furthermore, the action plan generation unit 144 may generates an action plan with respect to an arbitrary section without limitation to the above-described action plan.

For example, the action plan includes a plurality of events which are sequentially executed. Examples of the events include a deceleration event of decelerating the subject vehicle M, an acceleration event of accelerating the subject vehicle M, a lane keeping event of allowing the subject vehicle M to travel without deviating from a travel lane, a lane changing event of changing the travel lane, a passing event of allowing the subject vehicle M to pass a preceding vehicle, a branch event of changing a lane to a desired lane at a branch point or allowing the subject vehicle M to travel without deviating from the current travel lane, a merging event of accelerating or decelerating the subject vehicle M at a merging lane to be merged to a main lane, and changing a travel lane, an hand-over event of transitioning a manual driving mode to an automated driving mode at an initiation point of the automated driving or transitioning the automated driving mode to the manual driving mode at a scheduled termination point of the automated driving, and the like. At a site at which a target lane determined by the target lane determination unit 110 is switched, the action plan generation unit 144 sets the lane changing event, the branch event, or the merging event. Information indicating an action plan generated by the action plan generation unit 144 is stored in the storage 180 as the action plan information 186.

Figure 5:
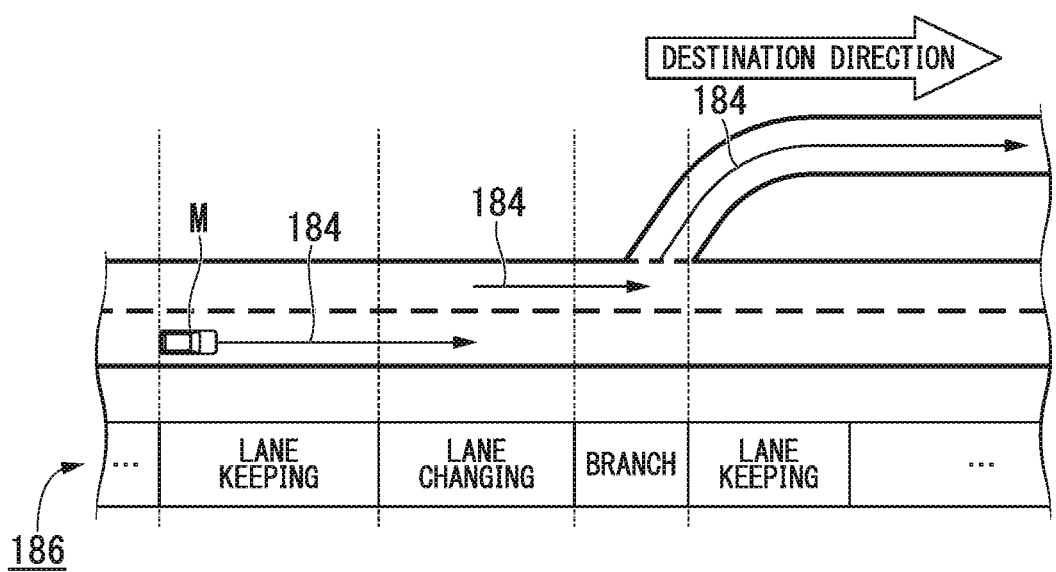
FIG. 5 is a view showing an example of an action plan that is generated with respect to an arbitrary section.

FIG. 5 is a view showing an example of an action plan that is generated with respect to an arbitrary section. As shown in FIG. 5, the action plan generation unit 144 generates an action plan that is necessary for the subject vehicle M to travel in a target lane indicated by the target lane information 184. Furthermore, the action plan generation unit 144 may dynamically change the action plan in correspondence with a situation variation of the subject vehicle M regardless of the target lane information 184. For example, in a case where a speed of a nearby vehicle recognized by the external field recognition unit 142 in travel exceeds a threshold value, or a movement direction of a nearby vehicle that travels in a lane adjacent to a subject lane faces a subject lane direction, the action plan generation unit 144 changes an event that is set in a driving section along which the subject vehicle M is scheduled to travel. For example, when in a case where an event is set so that the lane changing event is executed after the lane keeping event, if it is determined by a recognition result of the external field recognition unit 142 that a vehicle advances at a speed equal to or higher than a threshold value from a backward side of a lane that is a lane changing destination during the lane keeping event, the action plan generation unit 144 changes an event subsequent to the lane keeping event from the lane changing event to the deceleration event, the lane keeping event, and the like. As a result, even in a case where a variation occurs in the external field state, the vehicle control system 100 can allow the subject vehicle M to stably perform automated driving.

Figure 6:
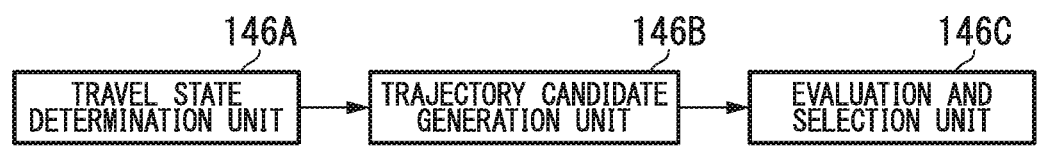
FIG. 6 is a view showing an example of a configuration of a trajectory generation unit 146.

FIG. 6 is a view showing an example of a configuration of the trajectory generation unit 146. For example, the trajectory generation unit 146 includes a travel aspect determination unit 146A, a trajectory candidate generation unit 146B, and an evaluation and selection unit 146C.

For example, when performing the lane keeping event, the travel aspect determination unit 146A determines any one travel aspect among constant speed travel, following travel, low-speed following travel, deceleration travel, curve travel, obstacle avoiding travel, and the like. For example, in a case where another vehicle does not exist in front of the subject vehicle M, the travel aspect determination unit 146A determines the travel aspect as the constant speed travel. In addition, in a case of performing the following travel with respect to a preceding vehicle, the travel aspect determination unit 146A determines that travel aspect as the following travel. In addition, in a traffic jam situation, and the like, the travel aspect determination unit 146A determines the travel aspect as the low-speed following travel. In addition, in a case where deceleration of a preceding vehicle is recognized by the external field recognition unit 142, or in a case of performing an event such as stopping and parking, the travel aspect determination unit 146A determines the travel aspect as the deceleration travel. In addition, in a case where the external field recognition unit 142 recognizes that the subject vehicle M reaches a curved road, the travel aspect determination unit 146A determines the travel aspect as the curve travel. In addition, in a case where the external field recognition unit 142 recognizes an obstacle in front of the subject vehicle M, the travel aspect determination unit 146A determines the travel aspect as the obstacle avoiding travel.

Figure 7:
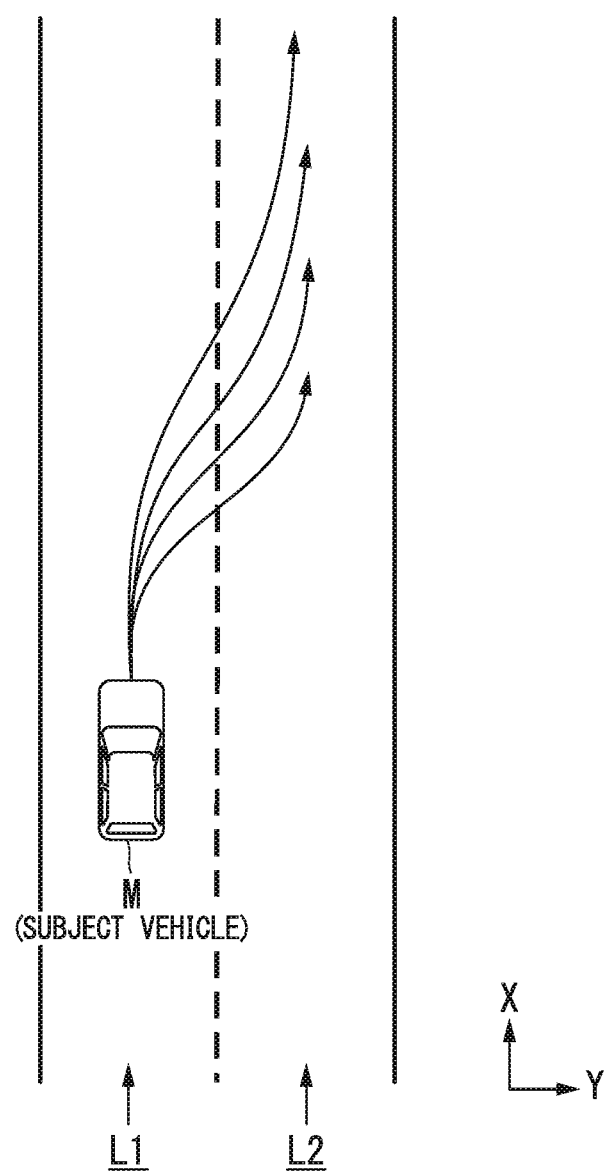
FIG. 7 is a view showing an example of a trajectory candidate that is generated by a trajectory candidate generation unit 146B.

The trajectory candidate generation unit 146B generates a trajectory candidate on the basis of a travel aspect determined by the travel aspect determination unit 146A. FIG. 7 is a view showing an example of a trajectory candidate generated by the trajectory candidate generation unit 146B. FIG. 7 shows the trajectory candidate that is generated in a case where the subject vehicle M changes a lane from a lane L1 to a lane L2.

Figure 8:
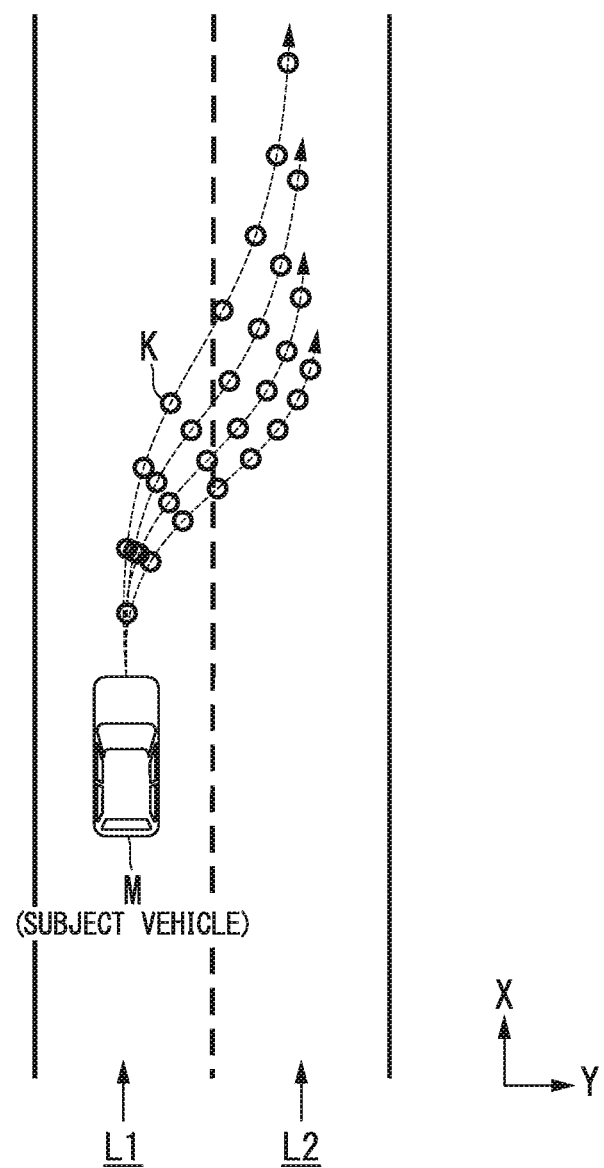
FIG. 8 is a view showing the trajectory candidate that is generated by the trajectory candidate generation unit 146B as a trajectory point K.

The trajectory candidate generation unit 146B determines trajectories shown in FIG. 7, for example, as a group of target positions (trajectory points K) in which a reference position (for example, the center of gravity or the center of a rear wheel axis) of the subject vehicle M is to reach for every predetermined time in the future. FIG. 8 is a view in which trajectory candidates generated by the trajectory candidate generation unit 146B are expressed as trajectory points K. As an interval between the trajectory points K is wider, a speed of the subject vehicle M is raised, and as the interval between the trajectory points K is narrower, the speed of the subject vehicle M is lowered. Accordingly, in a case of desiring to accelerate, the trajectory candidate generation unit 146B gradually widens the interval of the trajectory points K, and in a case of desiring to decelerate, the trajectory candidate generation unit 146B gradually narrows the intervals of the trajectory points.

As described above, since the trajectory points K include a speed component, it is necessary for the trajectory candidate generation unit 146B to apply a target speed to each of the trajectory points K. The target speed is determined by the travel aspect determined by the travel aspect determination unit 146A.

Figure 9:
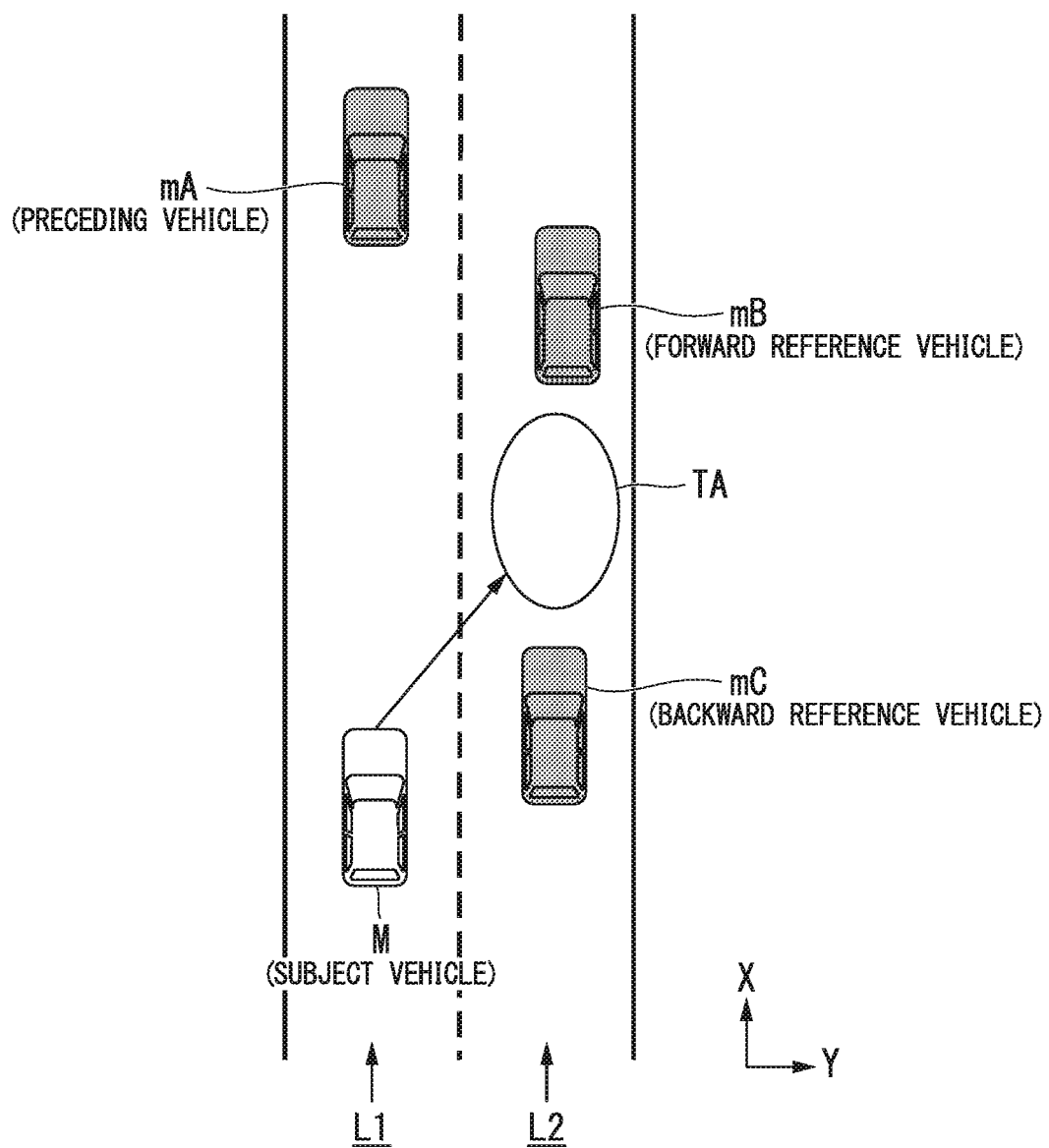
FIG. 9 is a view showing a lane changing target position TA.

Here, description will be given of a method of determining a target speed in a case of performing lane changing (including branch). First, the trajectory candidate generation unit 146B sets a lane changing target position (or a merging target position). The lane changing target position is set as a relative position with a nearby vehicle, and corresponds to determination of "lane is to be changed with respect to which nearby vehicle". The trajectory candidate generation unit 146B determines a target speed in a case of performing lane changing with focus given to three nearby vehicles with a lane changing target position set as a reference. FIG. 9 is a view showing a lane changing target position TA. In the drawing, L1 represents a subject lane, and L2 represents a nearby lane. Here, a nearby vehicle that travels immediately in front of the subject vehicle M in the same lane as that of the subject vehicle M is defined as a preceding vehicle mA, a nearby vehicle that travels immediately in front of the lane changing target position TA is defined as a forward reference vehicle mB, and a nearby vehicle that travels immediately behind the lane changing target position TA is defined as a backward reference vehicle mC. It is necessary for the subject vehicle M to perform acceleration/deceleration to move to a lateral side of the lane changing target position TA, but it is necessary for the subject vehicle M to avoid catching up with the preceding vehicle mA. According to this, the trajectory candidate generation unit 146B predicts a future state of the three nearby vehicles, and determines the target speed so as not to interfere with the nearby vehicles.

Figures 10, 11:
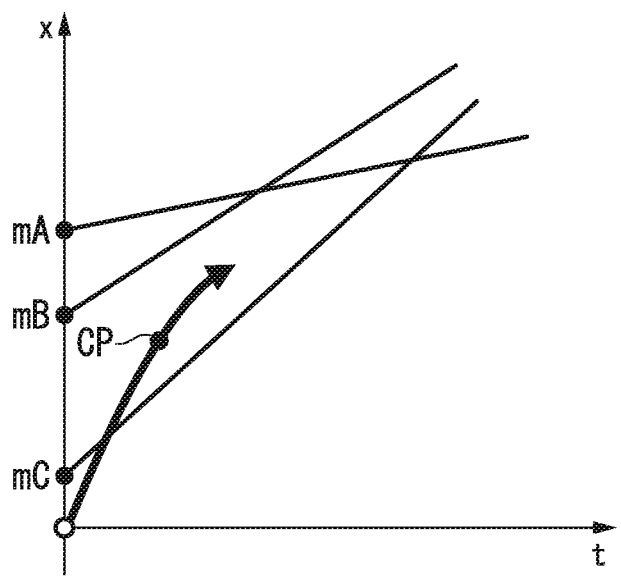
FIG. 10 is a view showing a speed generation model in a case where speeds of three nearby vehicles are assumed to be constant.
FIG. 11 is a view showing an example of information that is output from the HMI 70.

FIG. 10 is a view showing a speed generation model on the assumption that speeds of the three nearby vehicles are constant. In the drawing, straight lines, which extend from mA, mB, and mC, represent a displacement in an advancing direction on the assumption that the nearby vehicles travel at a constant speed. At a point CP at which lane changing is completed, it is necessary for the subject vehicle M to be present between the forward reference vehicle mB and the backward reference vehicle mC, and behind the preceding vehicle mA. Under the restriction, the trajectory candidate generation unit 146B derives a plurality of time-series patterns of a target speed until lane changing is completed. In addition, the time-series patterns of the target speed are applied to a model such as a spline curve to derive a plurality of the trajectory candidates as shown in FIG. 8. Furthermore, movement patterns of the three nearby vehicles may be predicted on the assumption of constant acceleration and constant jerk without limitation to the constant speed as shown in FIG. 10.

The evaluation and selection unit 146C performs evaluation with respect to the trajectory candidates generated by the trajectory candidate generation unit 146B, for example, from the two points of view of planning and stability, and selects a trajectory to be output to the travel control unit 160. For example, from the viewpoint of planning, in a case where trackability with respect to a plan (for example, an action plan) generated in advance is high and a total length of the trajectory is short, the trajectory is highly evaluated. For example, in a case where it is preferable to change a lane to the right, a trajectory in which a lane is changed to the left at once and returns is lowly evaluated. From the viewpoint of stability, for example, in each trajectory point, as a distance between the subject vehicle M and an object (a nearby vehicle and the like) is longer, a variation amount of acceleration or deceleration and a steering angel, and the like are smaller, the trajectory is highly evaluated.

The switching control unit 150 switches the automated driving mode and the manual driving mode from each other on the basis of a signal that is input from the automated driving switching switch 87, and the like. In addition, the switching control unit 150 switches the automated driving mode to the manual driving mode on the basis of an operation that gives an instruction for acceleration, deceleration, or steering with respect to a configuration of the driving operation system in the HMI 70. For example, in a case where a state, in which an operation amount indicated by a signal input from the configuration of the driving operation system in the HMI 70 exceeds a threshold value, continues for a reference time or longer, the switching control unit 150 switches the automated driving mode to the manual driving mode (overriding). In addition, after switching to the manual driving mode by the overriding, in a case where an operation with respect to the configuration of the driving operation system in the HMI 70 is not determined for a predetermined time, the switching control unit 150 may return the driving mode to the automated driving mode. In addition, for example, in a case of performing handover control of transitioning to the manual driving mode from the automated driving mode at a scheduled termination point of the automated driving, the switching control unit 150 outputs information indicating the gist to the HMI control unit 170 to notify a vehicle occupant of a handover request in advance.

The travel control unit 160 controls the travel drive force output device 200, the steering device 210, and the brake device 220 so that the subject vehicle M passes through a trajectory generated by the trajectory generation unit 146 at a scheduled time.

When being notified of automated driving mode information by the automated driving control unit 120, the HMI control unit 170 controls the HMI 70 in correspondence with an automated driving mode type with reference to the mode-specific operation availability information 188.

FIG. 11 is a view showing an example of the mode-specific operation availability information 188. The mode-specific operation availability information 188 shown in FIG. 11 includes a "manual driving mode" and an "automated driving mode" as an item of the driving mode item. In addition, the "automated driving mode" includes the "mode A", the "mode B", the "mode C", and the like. In addition, the mode-specific operation availability information 188 includes a "navigation operation" that is an operation with respect to the navigation device 50, a "content reproducing operation" that is an operation with respect to the content reproducing device 85, an "instrument panel operation" that is an operation with respect to the display 82, and the like as items of the non-driving operation system. In an example of the mode-specific operation availability information 188 shown in FIG. 11, availability of an operation by a vehicle occupant with respect to the non-driving operation system is set for every driving mode described above, but a target interface device is not limited thereto.

The HMI control unit 170 determines a device (a part or all of the navigation device 50 and the HMI 70) for which use is permitted, and a device for which use is not permitted with reference to the mode-specific operation availability information 188 on the basis of the mode information acquired from the automated driving control unit 120. In addition, the HMI control unit 170 controls acceptability of an operation from the vehicle occupant with respect to the HMI 70 or the navigation device 50 of the non-driving operation system on the basis of a determination result.

For example, in a case where the driving mode that is executed by the vehicle control system 100 is the manual driving mode, the vehicle occupant operates the driving operation system (for example, the accelerator pedal 71, the brake pedal 74, the shift lever 76, the steering wheel 78, and the like) of the HMI 70. In addition, in a case where the driving mode that is executed by the vehicle control system 100 is the mode B, the mode C, and the like of the automated driving mode, the peripheral monitoring duty of the subject vehicle M occurs in the vehicle occupant. In this case, the HMI control unit 170 performs control not to accept an operation with respect to a part or all of the non-driving operation systems of the HMI 70 so as to prevent the vehicle occupant from being distracted (driver distraction) due to an action (for example, an operation of the HMI 70, and the like) other than driving. At this time, the HMI control unit 170 allows the display 82 to display existence of a nearby vehicle of the subject vehicle M or a state of the nearby vehicle, which is recognized by the external field recognition unit 142, as an image and the like, and may allow the HMI 70 to accept an confirmation operation in correspondence with a situation when the subject vehicle M travels in order for the peripheral monitoring to be performed.

In addition, in a case where the driving mode is the mode A of the automated driving, the HMI control unit 170 mitigates regulation of the driver distraction, and performs control of accepting an operation of the vehicle occupant with respect to the non-driving operation system for which an operation is not accepted. For example, the HMI control unit 170 allows the display 82 to display a video, allows the speaker 83 to output voice, or allows the content reproduction device 85 to reproduce contents from a DVD and the like. Furthermore, the contents which are reproduced by the content reproduction device 85 may include various kinds of contents related to amusement or entertainment such as a television program in addition to contents stored in the DVD and the like. In addition, the "content reproduction operation" shown in FIG. 11 may represent a content operation related to the amusement or entertainment.

In addition, in a case where the mode A transitions to the mode B or the mode C, that is, mode change of the automated driving in which the periphery monitoring duty of the vehicle occupant increases is performed, the HMI control unit 170 receives a notification from the future state prediction unit 152 to be described later, and allows the navigation device 50 or the HMI 70 of the non-driving operation system to output predetermined information. The predetermined information is information indicating that the peripheral monitoring duty increases, or information indicating that the degree of permission of an operation with respect to the navigation device 50 or the HMI 70 of the non-driving operation system is lowered (an operation is limited). Furthermore, the predetermined information is not limited thereto, and may be, for example, information that encourages preparation to hand-over control.

As described above, the HMI control unit 170 can notify the vehicle occupant of imposing of the peripheral monitoring duty of the subject vehicle M on the vehicle occupant at an appropriate timing, for example, by notifying the vehicle occupant of an alarm and the like before a predetermined time at which the driving mode transitions from the mode A to the mode B or the mode C, or before the subject vehicle M reaches a predetermined speed. As a result, it is possible to provide a preparation period for switching of the automated driving to the vehicle occupant.

[Control Based on Future State Prediction]

Hereinafter, description will be given of control based on a prediction result by the future state prediction unit 152. For example, the future state prediction unit 152 predicts a future state related to the subject vehicle M or the periphery of the subject vehicle M with reference to the traffic information acquired by the communication device 55.

For example, with regard to a current advancing direction of the subject vehicle M, the future state prediction unit 152 predicts whether or not a specific site at which necessity for switching from the automated driving mode to the manual driving mode occurs exists, or whether or not a specific site at which necessity for switching to a mode in which the peripheral monitoring duty further increases such as transition from the mode A to the mode B occurs exists under the automated driving mode in front of the subject vehicle M with reference to the traffic information. Examples of the specific site includes an area in which a traffic accident occurs (hereinafter, referred to as "accident area"), a construction site, an inspection site, a merging site, a branch site, a tollgate, and the like.

In a case where the specific site exists, the future state prediction unit 152 predicts whether or not a driving mode switched or released at the specific site will return to the original state after the specific site.

Furthermore, among the specific sites, with respect to the merging site, the branch site, and the tollgate which are locations of which a position is fixed, the future state prediction unit 152 may specify the specific sites with reference to the high-accuracy map information 182, and may predict a future state related to the subject vehicle M or the periphery of the subject vehicle M.

Figure 12:
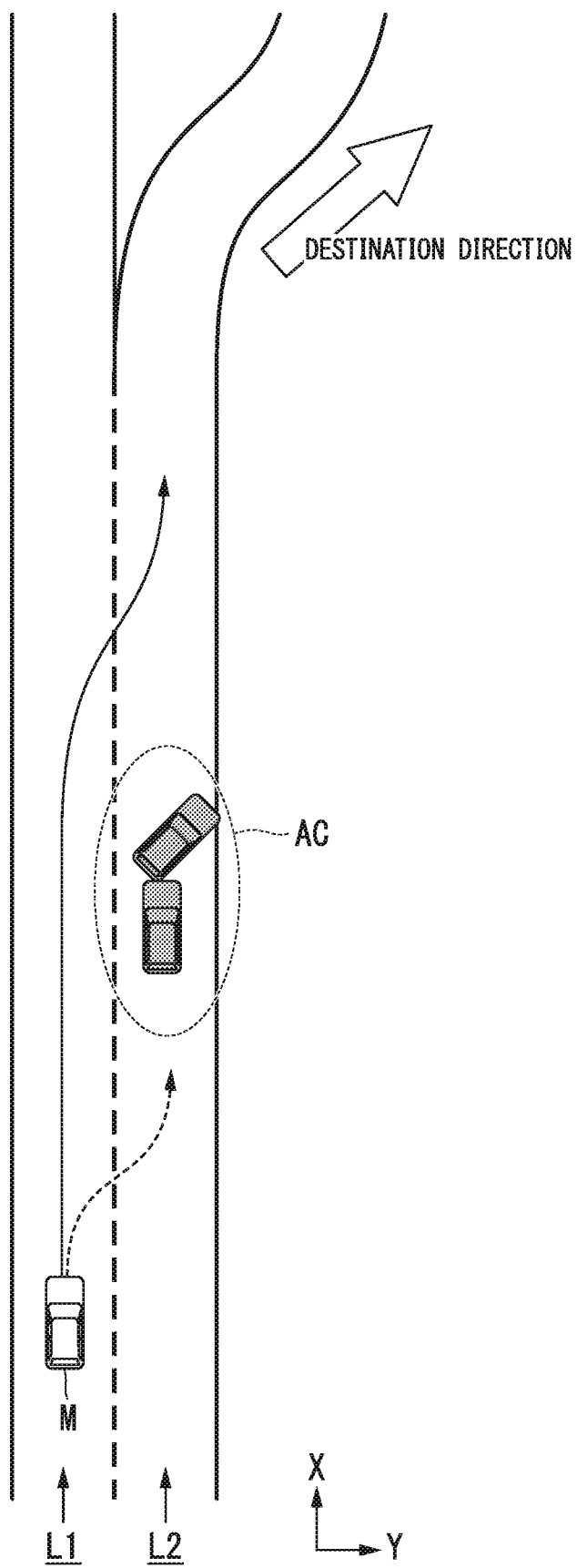
FIG. 12 is a view schematically showing an example of a future state that is predicted on the basis of traffic information.

FIG. 12 is a view schematically showing an example of a future state that is predicted on the basis of traffic information. In the example shown in FIG. 12, a destination direction exists on an advancing direction side of an adjacent lane L2 that is adjacent to a subject lane L1, and thus it is necessary to perform lane changing to the adjacent lane L2.

In this case, in a case where an accident area AC exists on the adjacent lane L2, the future state prediction unit 152 predicts that it is necessary to bypass the accident area AC after performing lane changing to the adjacent L2. In a case where the lane changing to the adjacent lane L2 is immediately performed in this situation, after returning to the original lane L1, lane changing to the adjacent lane L2 is performed again, and thus a vehicle occupant may feel discomfort. In addition, when the subject vehicle M performs an unnecessary behavior, it is not preferable from the viewpoint of safety. According to this, the future state prediction unit 152 notifies any one or both of the action plan generation unit 144 and the trajectory generation unit 146 of a prediction result, and allows the action plan generation unit 144 to change lane changing event or allows the trajectory generation unit 146 to change a trajectory for lane changing, thereby suppressing execution of the lane changing event. According to this, the vehicle control system 100 can suppress unnecessary switching of the vehicle control.

Figure 13:
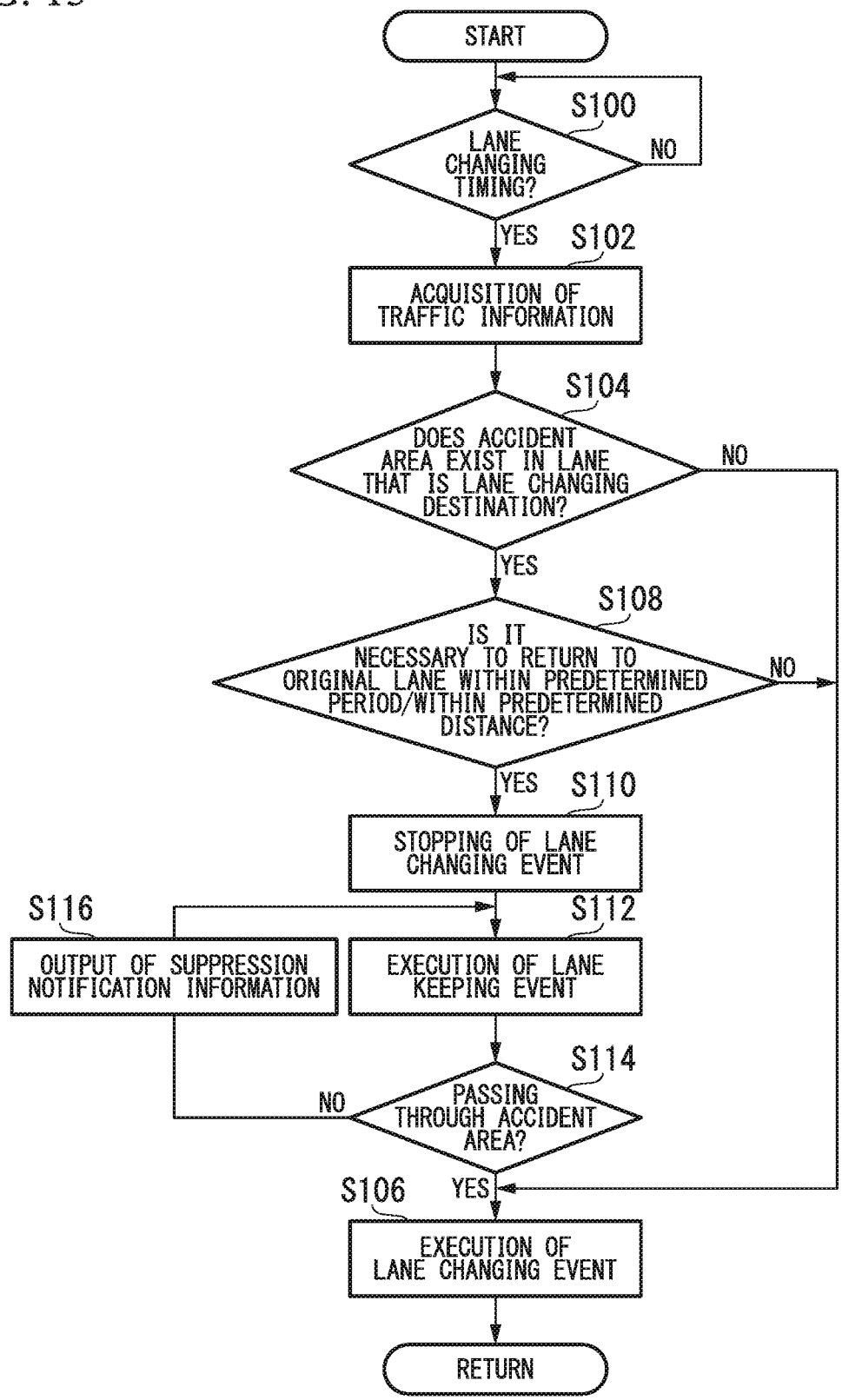
FIG. 13 is a flowchart showing an example of a flow of processing that is performed by the vehicle control system 100 in the situation shown in FIG. 12.

FIG. 13 is a flowchart showing an example a flow of processing that is performed by the vehicle control system 100 in the situation shown in FIG. 12. First, the future state prediction unit 152 waits to a timing at which the lane changing event is executed with reference to the action plan information 186 (step S100), and acquires traffic information from the communication device 55 when reaching the execution timing of the lane changing event (step S102).

Next, the future state prediction unit 152 determines whether or not the specific site such as the accident area exists in a lane that is a lane changing destination with reference to the acquired traffic information (step S104). In a case where the specific site does not exist in the lane that is the lane changing destination, the future state prediction unit 152 notifies, for example, the trajectory generation unit 146 of the prediction result to generate a trajectory for lane changing. According to this, the lane of the subject vehicle M is changed (step S106).

On the other hand, in a case where the specific site exists in the lane that is the lane changing destination, the future state prediction unit 152 determines whether or not to return to the original lane within a predetermined period or in a predetermined travel distance (step S108). In a case where it does not return to the original lane within the predetermined period or within the predetermined travel distance, the vehicle control system 100 performs the processing in step S106.

On the other hand, in a case where it returns to the original lane within the predetermined period or the predetermined travel distance, the future state prediction unit 152 notifies the action plan generation unit 144 or the trajectory generation unit 146 of the prediction result to stop execution of the lane changing event (step S110) and to execute the lane keeping event instead of the lane changing event (step S112).

Next, the HMI control unit 170 allows the navigation device 50 or the HMI 70 to output information indicating that execution of the lane changing event is suppressed (suppression notification information in the drawing) (step S116) until passing through the accident area (step S114). When passing through the accident area, the vehicle control system 100 performs the processing in step S106.

Figure 14:
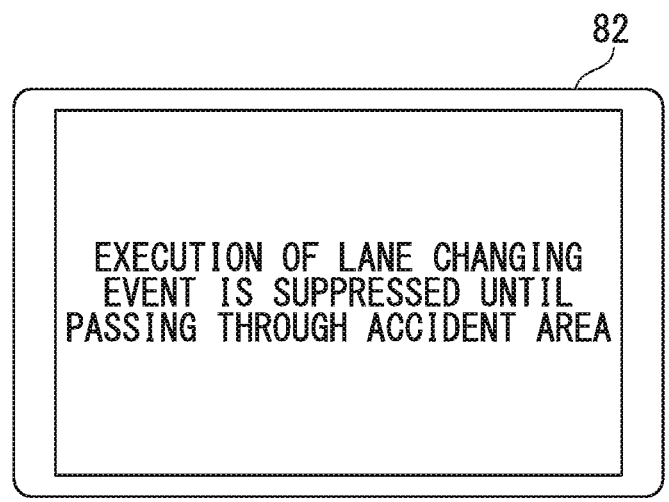
FIG. 14 is a view showing an example of suppression notification information that is output from a navigation device 50 or the HMI 70.

FIG. 14 is a view showing an example of suppression notification information that is output from the navigation device 50 or the HMI 70. As shown in the drawing, for example, the HMI control unit 170 controls the navigation device 50 or the HMI 70 to notify a vehicle occupant of a situation in which switching from the lane keeping event to the lane changing event is suppressed with an image, voice, or the like.

Figure 15:
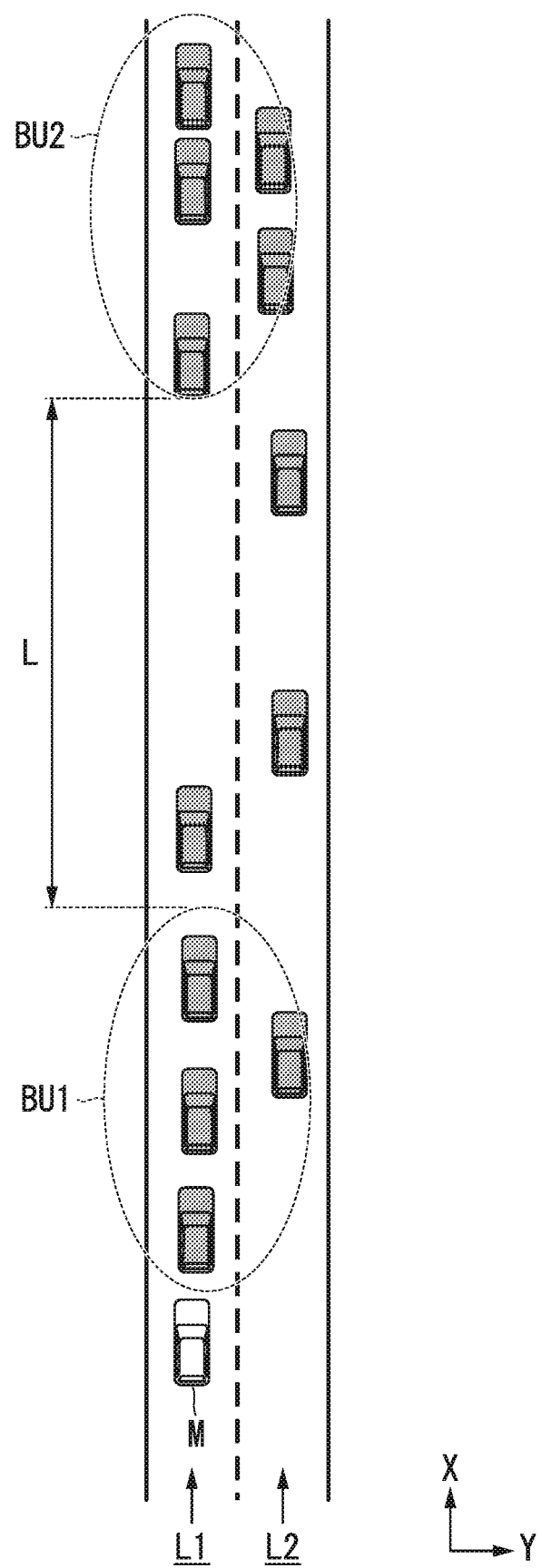
FIG. 15 is a view schematically showing another example of a future state that is predicted on the basis of the traffic information.

FIG. 15 is a view schematically showing another example of the future state that is predicted on the basis of the traffic information. In the example shown in FIG. 15, a situation in which traffic jam intermittently continues in front of the subject vehicle M. For example, the intermittent traffic jam is a situation in which a site (BU2 in the drawing), in which another traffic jam occurs, exists at a site spaced away from a site (BU1 in the drawing), in which traffic jam occurs, by a distance L.

In this case, if a future state is not considered, the automated driving control unit 120 may set the travel aspect of the automated driving mode to a traffic jam following mode in the mode A at the traffic jam site BU1, may set the travel aspect of the automated driving mode to, for example, the constant speed travel aspect in the mode B in a section between the traffic jam sites BU1 and BU2, and may set the travel aspect of the automated driving mode to the traffic jam following mode in the mode A at the traffic jam site BU2. As a result, there is a possibility that unnecessary switching of the vehicle control may occur in a short period until reaching the traffic jam site BU2 from the traffic jam site BU1.

In addition, in the traffic jam sites BU1 and BU2, setting is made to the mode A, the content reproduction device 85 can reproduce various contents related to amusement and entertainment. However, in the traffic jam section, necessity for peripheral monitoring by the vehicle occupant occurs, and thus videos displayed on the display 82, contents reproduced by the content reproduction device 85, and the like are stopped. As a result, for example, the vehicle occupant needs to temporarily stop viewing of a television program in viewing, and thus the vehicle occupant may feel discomfort.

In contrast, in a case where the future state prediction unit 152 can predict that it reaches the subsequent traffic jam site BU2 within a predetermined period or within a predetermined travel distance after passing through the traffic jam site BU1 with reference to traffic information, the future state prediction unit 152 notifies the automated driving mode control unit 130 of the prediction result to maintain setting of the mode A in the section between the traffic jam sites BU1 and BU2. According to this, the vehicle control system 100 can suppress unnecessary switching of the vehicle control while improving convenience of the vehicle occupant.

Figure 16:
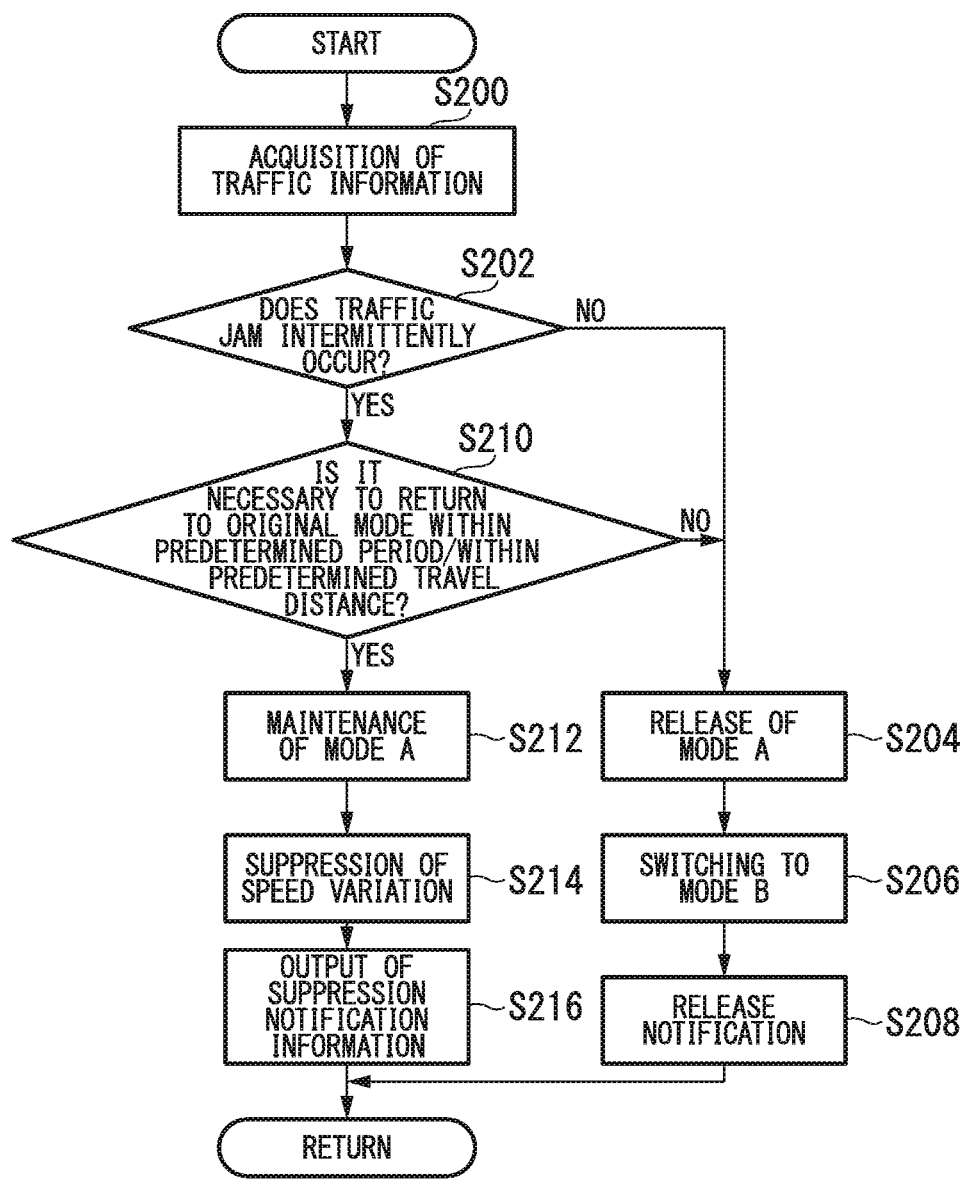
FIG. 16 is a flowchart showing an example of a flow of processing that is performed by the vehicle control system 100 in the situation shown in FIG. 15.

FIG. 16 is a flowchart showing an example of a flow of processing that is performed by the vehicle control system 100 in the situation shown in FIG. 15. For example, the processing of this flowchart is performed in a state in which the automated driving mode is set to the mode A in which the travel aspect is set to the traffic jam following mode.

First, the future state prediction unit 152 acquires traffic information from the communication device 55 (step S200). Next, the future state prediction unit 152 determines whether or not traffic jam intermittently occurs in front of the subject vehicle M with reference to the acquired traffic information (step S202). In a case where the traffic jam does not intermittently occur, the automated driving mode control unit 130 releases the mode A in which the travel aspect is set to the traffic jam following mode (step S204), and perform mode changing to the mode B in which the travel aspect is, for example, the constant travel aspect, or the like (step S206). Furthermore, the mode changed from the mode A is not limited to the mode B, and may be another mode such as the mode C and a manual driving mode.

Next, the HMI control unit 170 allows the navigation device 50 or the HMI 70 to output information indicating occurrence of switching of the driving mode to notify the vehicle occupant of necessity for the duty of peripheral monitoring (step S208). At this time, in a case where the content reproduction device 85 is reproducing contents such as contents of a DVD or as a television program, the HMI control unit 170 stops the reproduction.

On the other hand, in a case where the traffic jam intermittently occurs, the future state prediction unit 152 determines whether or not it reaches another traffic jam site within a predetermined period or within a predetermined travel distance after passing through a traffic jam site closest to the subject vehicle M. That is, the future state prediction unit 152 determines whether or not the mode B changed from the mode A is changed to the original mode A within a predetermined period or within a predetermined travel distance after passing through the traffic site closest to the subject vehicle M (step S210).

In a case where the mode B is not changed to the original mode A within a predetermined period or within a predetermined travel distance, the vehicle control system 100 allows the processing to transition to step S204. On the other hand, in a case where the mode B is changed to the original mode A within a predetermined period or within a predetermined travel distance, the future state prediction unit 152 notifies the automated driving mode control unit 130, the action plan generation unit 144, the trajectory generation unit 146, and the like of a prediction result indicating that the mode B that is set is changed to the original mode A within a predetermined period or within a predetermined travel distance after passing through a traffic jam site. For example, the automated driving mode control unit 130 that is notified of the prediction result maintains the mode A in which the travel aspect is set to the traffic jam following mode even in a section in which traffic jam is temporarily solved (step S212).

Next, the trajectory generation unit 146 that is notified of the prediction result monitors a speed variation of the subject vehicle M so that the mode A (traffic jam following mode) is maintained in a section in which traffic jam is temporarily solved. In addition, the trajectory generation unit 146 suppresses the speed of the subject vehicle M to less than a predetermined speed by adjusting an interval of the trajectory point K so that a travel speed of the subject vehicle M becomes less than a predetermined speed (step S214). That is, the trajectory generation unit 146 suppresses the speed of the subject vehicle M to less than a predetermined speed so as to suppress determination by the automated driving mode control unit 130 as solving of traffic jam, thereby maintaining the setting of the mode A which is the traffic jam following mode.

Next, the HMI control unit 170 allows the navigation device 50 or the HMI 70 to output suppression notification information indicating that switching of the driving mode is suppressed (step S216).

Furthermore, instead of the flow of processing shown in FIG. 16, it is also possible to employ a flow of processing in which determination in step S210 is performed at a timing at which traffic jam is solved, a forward side of the subject vehicle M is opened, and thus a mode other than the traffic jam following mode can be selected.

Figure 17:
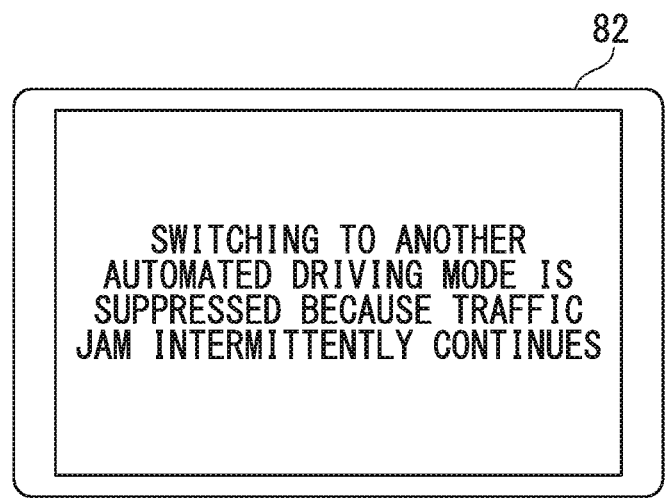
FIG. 17 is a view showing another example of the suppression notification information that is output from the navigation device 50 or the HMI 70.

FIG. 17 is a view showing another example of the suppression notification information that is output from the navigation device 50 or the HMI 70. As shown in the drawing, for example, the HMI control unit 170 controls the navigation device 50 or the HMI 70 to notify a vehicle occupant of a situation in which mode switching such as switching from the mode A to the mode B is suppressed with an image, voice, or the like. At this time, in a case where the content reproduction device 85 is reproducing contents such as contents of a DVD or as a television program, the HMI control unit 170 allows the reproduction to continue.

Figure 18:
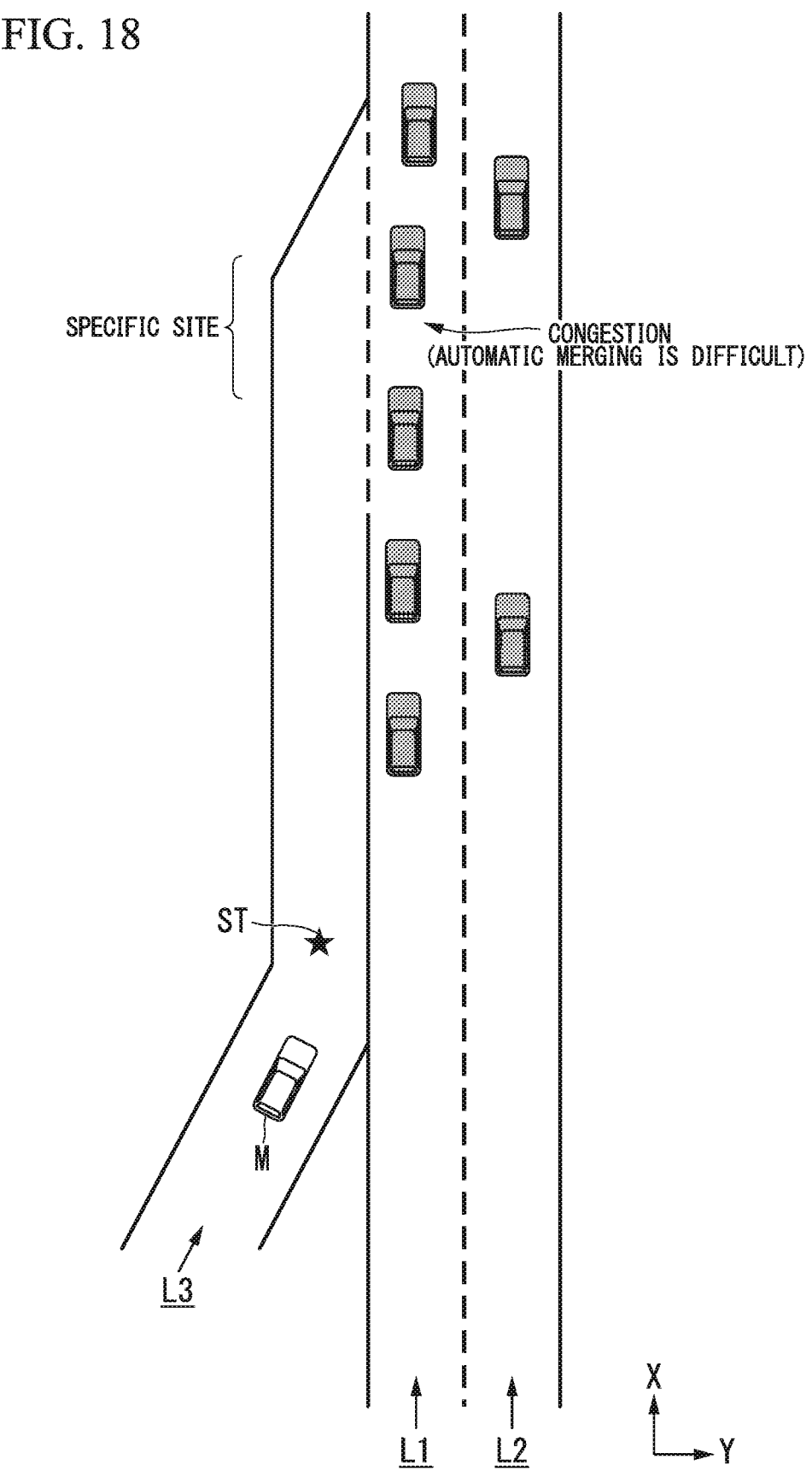
FIG. 18 is a view schematically showing still another example of the future state that is predicted on the basis of the traffic information.

FIG. 18 is a view schematically showing still another example of the future state that is predicted on the basis of the traffic information. In the example shown in FIG. 18, a situation in which the subject vehicle M joins to a lane L1 of main lanes from a branch lane L3 is shown. In addition, the example in the drawing shows a situation in which an interval between vehicles travelling in the lane L1 of the main lanes is narrow and is congested, and thus merging in the automated driving mode is impossible (or difficult). Accordingly, this merging site is handled as a specific site at which necessity for switching from the automated driving mode to the manual driving mode occurs. A situation of travelling at the specific site in FIG. 18 is an example of a "predetermined situation".

In this case, when a future state is not considered, for example, the automated driving control unit 120 initiates the automated driving mode from an automated driving initiation-possible site ST, and releases the automated driving mode at the specific site (merging site). As a result, there is a possibility that unnecessary switching of the vehicle control may occur in a short period before merging.

In contrast, in a case where the future state prediction unit 152 can predict that it reaches the specific site within a predetermined period or within a predetermined travel distance after passing through the automated driving initiation-possible site ST, for example, with reference to one or both of the traffic information and the high-accuracy map information 182, the future state prediction unit 152 notifies both the switching control unit 150 and the HMI control unit 170 of the prediction result.

For example, when the action plan generation unit 144 is notified of the prediction result, even in a section in which various events are planned under a main body automated driving mode, the action plan generation unit 144 changes the events in this section to an hand-over event, and allows the automated driving mode to transition to the manual driving mode. In addition, when the switching control unit 150 is notified of the prediction result, the switching control unit 150 switches the driving mode that is executed from the automated driving mode to the manual driving mode. According to this, the vehicle control system 100 can suppress unnecessary switching of the vehicle control. As a result, the driving mode is suppressed from being frequently changed, and thus the vehicle occupant can concentrate on driving of the subject vehicle M.

Figure 19:
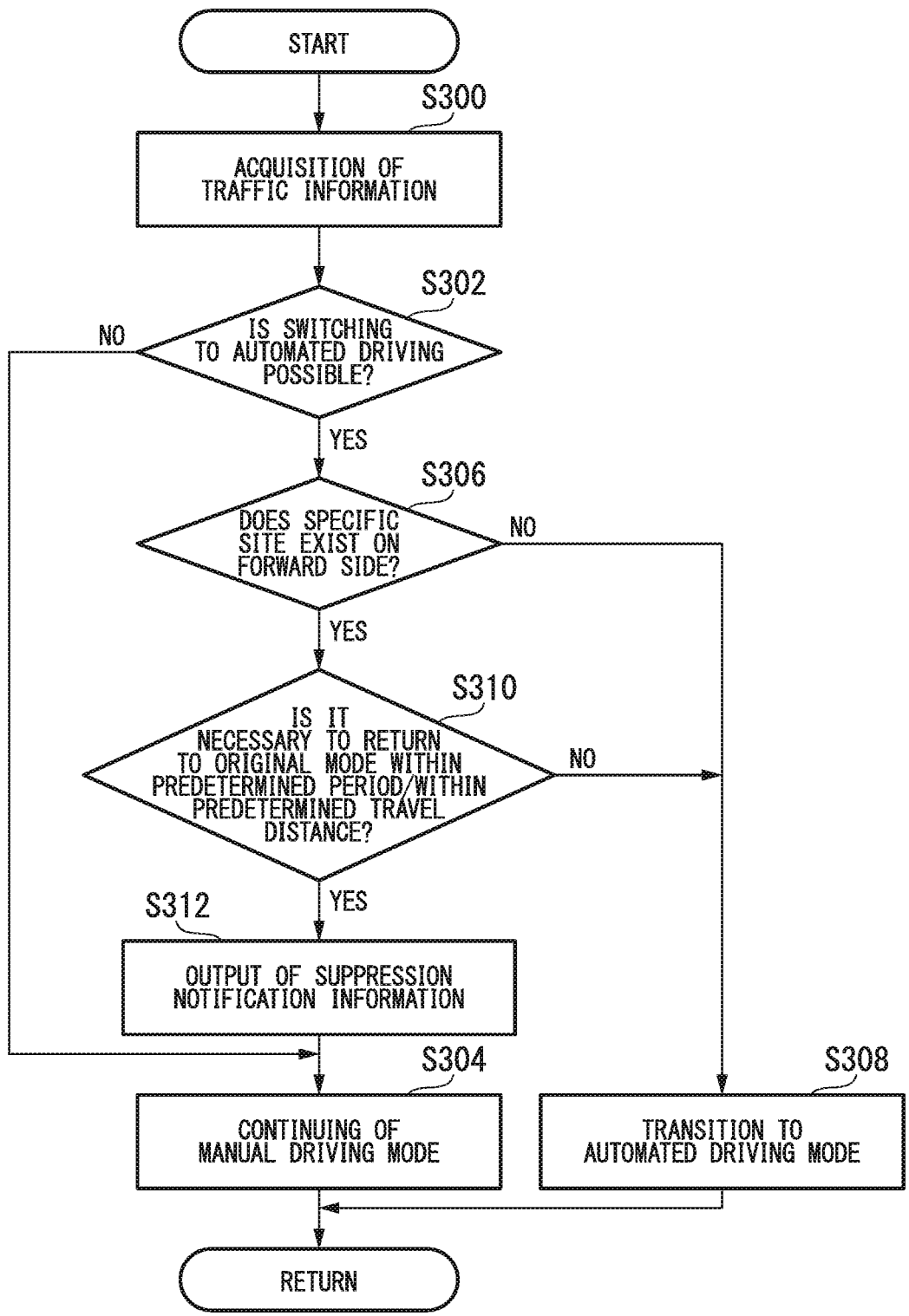
FIG. 19 is a flowchart showing an example of a flow of processing that is performed by the vehicle control system 100 in a situation shown in FIG. 18.

FIG. 19 is a flowchart showing an example of a flow of processing that is performed by the vehicle control system 100 in the situation shown in FIG. 18. Processing of this flowchart is performed under the manual driving mode.

First, the future state prediction unit 152 acquires traffic information from the communication device 55 (step S300). Next, the future state prediction unit 152 determines the automated driving initiation-possible site ST in front of the subject vehicle M with reference to one or both of the traffic information and the high-accuracy map information 182, and determines whether or not switching from the manual driving mode to the automated driving mode is possible (step S302). In a case where switching from the manual driving mode to the automated driving mode is not possible, the switching control unit 150 continues the manual driving mode (step S304).

On the other hand, in a case where switching from the manual driving mode to the automated driving mode is possible, the future state prediction unit 152 determines whether or not a specific site exists in front of the automated driving initiation-possible site ST (step S306). In a case where the specific site does not exist in front of the site ST, the switching control unit 150 switches the driving mode that is executed from the manual driving mode to the automated driving mode (step S308).

On the other hand, in a case where the specific site exists in front of the site ST, the future state prediction unit 152 determines whether or not the subject vehicle M reaches the specific site within a predetermined period or within a predetermined travel distance. That is, the future state prediction unit 152 determines whether or not the automated driving mode changed from the manual driving mode is changed to the original manual driving mode within a predetermined period or within a predetermined travel distance after passing through the site ST (step S310).

In a case where the automated driving mode is not changed to the original manual driving mode with a predetermined period or within a predetermined travel distance, the vehicle control system 100 allows the processing to transition to step S308. On the other hand, a case where the automated driving mode is changed to the original manual driving mode with a predetermined period or within a predetermined travel distance, the future state prediction unit 152 notifies the switching control unit 150 and the HMI control unit 170 of the prediction result. The HMI control unit 170 that is notified of the prediction result allows the navigation device 50 or the HMI 70 to output the suppression notification information indicating that switching to the automated driving mode is suppressed (step S312). In addition, the switching control unit 150 that is notified of the prediction result allows the processing to transition to step S304.

Figure 20:
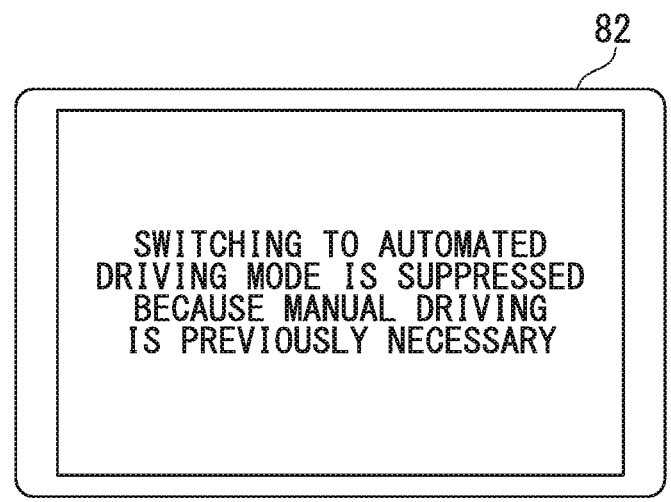
FIG. 20 is a view showing still another example of the suppression notification information that is output from the navigation device 50 or the HMI 70.

FIG. 20 is a view showing still another example of the suppression notification information that is output from the navigation device 50 or the HMI 70. As shown in the drawing, for example, the HMI control unit 170 controls the navigation device 50 or the HMI 70 to notify the vehicle occupant of a situation in which switching from the manual driving mode to the automated driving mode is suppressed with an image, voice, or the like.

According to the above described embodiment, a traffic situation of an advancing direction destination of the subject vehicle M is acquired, a future state related to the subject vehicle M or the periphery of the subject vehicle M is predicted with reference to the acquired traffic situation, and in a case where it is predicted that vehicle control will return to a state before switching or release is performed within a predetermined period or within a predetermined travel distance after performing the switching or the release of the vehicle control, the switching or the release of the vehicle control is suppressed to suppress unnecessary switching of the vehicle control.

Hereinbefore, aspects for carrying out the invention have been described with reference to the embodiment, but the invention is not limited to the embodiment, and various modifications and substitutions can be made in a range not departing from the gist of the invention.

REFERENCE SIGNS LIST

20 Finder
30 Radar
40 Camera
DD Detection device
50 Navigation device
60 Vehicle sensor
70 HMI
100 Vehicle control system
110 Target lane determination unit
120 Automated driving control unit
130 Automated driving mode control unit
140 Subject vehicle position recognition unit
142 External field recognition unit
144 Action plan generation unit
146 Trajectory generation unit
146A Travel aspect determination unit
146B Trajectory candidate generation unit
146C Evaluation and selection unit
150 Switching control unit
152 Future state prediction unit
160 Travel control unit
170 HMI control unit
180 Storage
200 Travel drive force output device
210 Steering device
220 Brake device
M Subject vehicle

What is claim is:

1. A vehicle control system, comprising:
a memory that stores executable components; and
a processor, operatively coupled to the memory, that executes the executable components, the executable components comprising:
an acquirer configured to acquire information regarding a traffic situation of an advancing direction destination of a host vehicle;
a predictor configured to generate a trajectory candidate defining a trajectory for approaching the advancing direction destination, and to predict a future state related to the host vehicle or a periphery of the host vehicle with reference to the traffic situation if the trajectory candidate were to be implemented; and
a controller configured to perform vehicle control, and, in response to a determination by the predictor that switching or release of the vehicle control to implement the trajectory candidate will require the host vehicle to transition from a first state to a second state and to return to the first state due to the traffic situation at a specific site, suppress the switching or release of the vehicle control.

2. The vehicle control system according to claim 1, wherein suppression of the switching or release of the vehicle control by the controller in response to the determination by the predictor comprises delaying a planned lane change until the host vehicle moves past the specific site.

3. The vehicle control system according to claim 1, wherein
the controller is configured to switch or release the vehicle control based on a speed condition, and
suppression of the switching or release of the vehicle control by the controller in response to the determination by the predictor comprises suppressing a speed variation that satisfies the speed condition.

4. The vehicle control system according to claim 1, wherein the controller is configured to
perform an automated driving mode in which at least one of acceleration or steering of the host vehicle is automatically controlled,
switch from the automated driving mode to a manual driving mode in response to detection of a defined situation, and
suppress switching from the manual driving mode to the automated driving mode in response to a prediction by the predictor that the defined situation will recur within a defined time after switching from the manual driving mode to the automated driving mode.

5. The vehicle control system according to claim 1, wherein the executable components further comprise an outputter configured to output information indicating that the controller has suppressed the switching or release of the vehicle control.

6. The vehicle control system according to claim 1, wherein
the executable components further comprise a communicator that is configured to perform communication with an outside of the host vehicle, and
the predictor is configured to predict whether the vehicle control will return to a state prior to the switching or release based on information received by the communicator.

7. A vehicle control system, comprising:
a memory that stores executable components; and
a processor, operatively coupled to the memory, that executes the executable components, the executable components comprising:
an acquirer configured to acquire a traffic situation of an advancing direction destination of a host vehicle;
a predictor configured to determine a trajectory candidate defining a trajectory for approaching the advancing direction destination, and to predict a future state related to the host vehicle or the periphery of the host vehicle with reference to the traffic situation for a scenario in which the trajectory candidate is implemented; and
a controller configured to
selectively perform any one of a plurality of automated driving modes that differ in a degree of periphery monitoring required of a vehicle occupant during automated driving, and
in response to a determination by the predictor that switching or release of one of the automatic driving modes to implement the trajectory candidate will cause the host vehicle to transition from a first state to a second state and to return, within a defined period or a defined distance after the switching or release, to the first state due to the traffic situation, suppress the switching or release of the one of the automated driving modes.

8. A vehicle control method, comprising:
generating, by a system comprising a processor, a trajectory candidate defining a trajectory for approaching an advancing direction destination of a host vehicle, wherein implementation of the trajectory candidate involves switching or release of automated vehicle control by a controller;
predicting, by the system based on a detected traffic situation of the advancing direction destination, a future state of the host vehicle or a periphery of the host vehicle if the trajectory candidate were to be implemented; and
in response to predicting, based on the future state, that the switching or release of the automated vehicle control to implement the trajectory candidate will cause the host vehicle to transition from a first state to a second state and to return to the first state due to the traffic situation, suppressing, by the system, the switching or release of the automated vehicle control by changing a trajectory along which the host vehicle travels.

9. A non-transitory computer-readable medium having stored thereon instructions that, in response to execution, cause an in-vehicle computer to perform operations, the operations comprising:
generating a trajectory candidate defining a trajectory for approaching an advancing direction destination of a host vehicle, wherein implementation of the trajectory candidate involves switching or release of automated vehicle control by a controller;
predicting a future state of the host vehicle or a periphery of the host vehicle if the trajectory candidate were to be implemented with reference to a detected traffic situation of the advancing direction destination; and
in response to predicting, based on the future state, that the switching or release of the automated vehicle control to implement the trajectory candidate will cause the host vehicle to transition from a first state to a second state and to return to the first state due to the traffic situation, suppressing the switching or release of the automated vehicle control by changing a trajectory along which the host vehicle travels.

10. A vehicle control method comprising:
generating, by an in-vehicle computer comprising a processor, a trajectory candidate defining a trajectory for a host vehicle to approach an advancing destination;
predicting, by the in-vehicle computer based on a detected traffic situation of the advancing destination of the host vehicle, a future state that will be experienced by the host vehicle or the periphery of the host vehicle if the trajectory candidate is implemented;
selectively switching, by the in-vehicle computer, between a plurality of automated driving modes that differ in a degree of periphery monitoring required of a vehicle occupant during automated driving; and
in response to predicting, based on the future state, that switching or releasing an automated driving mode, of the plurality of automated driving modes, to implement the trajectory candidate will cause the host vehicle to transition from a first state to a second state and to return, due to the traffic situation, to the first state within a defined period of time or a defined travel distance after the switching or releasing, suppressing, by the in-vehicle computer, the switching or releasing of the automated driving mode.

11. A computer-readable non-transitory storage medium storing a vehicle control program that is configured to cause an in-vehicle computer to perform operations, the operations comprising:
- generating a trajectory candidate defining a trajectory for a host vehicle to approach an advancing destination;
- predicting, based on a detected traffic situation of the advancing destination of the host vehicle, a future state that will be experienced by the host vehicle or the periphery of the host vehicle if the trajectory candidate is implemented;
- selectively switching between a plurality of automated driving modes that differ in a degree of periphery monitoring required of a vehicle occupant during automated driving; and
- in response to predicting, based on the future state, that switching or releasing an automated driving mode, of the plurality of automated driving modes, to implement the trajectory candidate will cause the host vehicle to transition from a first state to a second state and to return, due to the traffic situation, to the first state within a defined period of time or a defined travel distance after the switching or releasing, suppressing, by the in-vehicle computer, the switching or releasing of the automated driving mode.

* * * * *